(12) United States Patent
Thienard

(10) Patent No.: US 7,481,596 B2
(45) Date of Patent: Jan. 27, 2009

(54) CONNECTOR WHICH IS USED TO JOIN A WINDSCREEN WIPER ARM TO A WIPER BLADE

(75) Inventor: Jean-Claude Thienard, Gisors (FR)

(73) Assignee: Valeo Systemes d'Essuyage, La Verriere (FR)

( * ) Notice: Subject to any disclaimer, the term of this patent is extended or adjusted under 35 U.S.C. 154(b) by 255 days.

(21) Appl. No.: 10/539,136

(22) PCT Filed: Dec. 15, 2003

(86) PCT No.: PCT/EP03/14236

§ 371 (c)(1),
(2), (4) Date: Jun. 15, 2005

(87) PCT Pub. No.: WO2004/056625

PCT Pub. Date: Jul. 8, 2004

(65) Prior Publication Data

US 2006/0115325 A1 Jun. 1, 2006

(30) Foreign Application Priority Data

Dec. 20, 2002 (FR) .................................. 02 16451

(51) Int. Cl.
*F16B 21/07* (2006.01)

(52) U.S. Cl. ........................... 403/329; 403/2; 403/328; 403/330; 15/250.32; 15/250.351

(58) Field of Classification Search .............. 15/250.32, 15/250.351; 403/2, 326, 328, 329, 330; *B60S 1/40*
See application file for complete search history.

(56) References Cited

U.S. PATENT DOCUMENTS

| 5,289,608 | A |   | 3/1994 | Kim |   |
|---|---|---|---|---|---|
| 5,611,103 | A | * | 3/1997 | Lee | .......................... 15/250.32 |
| 5,885,023 | A | * | 3/1999 | Witek et al. | .............. 15/250.32 |
| 6,640,380 | B2 | * | 11/2003 | Rosenstein et al. | ....... 15/250.32 |
| 2002/0174505 | A1 | * | 11/2002 | Kim | .......................... 15/250.32 |

FOREIGN PATENT DOCUMENTS

| EP | 0 863 058 | * | 9/1998 |
| FR | 2 692 537 | A3 | 12/1993 |
| WO | WO-01/15945 | A1 | 3/2001 |
| WO | WO-01/15946 | A1 | 3/2001 |

* cited by examiner

*Primary Examiner*—Michael P Ferguson
(74) *Attorney, Agent, or Firm*—Osha·Liang LLP

(57) ABSTRACT

A connector for connecting a windshield wiper arm to an element of a support structure element of a wiper blade unit includes two parallel vertical side cheek plates interconnected by a body. A first transverse hinge pin can be inserted radially into a first recess in the body. An outside convex cylindrical face portion of the body and two inside vertical longitudinal faces of the side cheek plates are configured to receive an inside wall of the end of an arm that belongs to a first category of arm. A second cylindrical recess of the body is capable of receiving a second transverse pin of an arm that belongs to a second category of arm. The connector is also internally configured for receiving the end of an arm that belongs to a third category of arm.

31 Claims, 14 Drawing Sheets

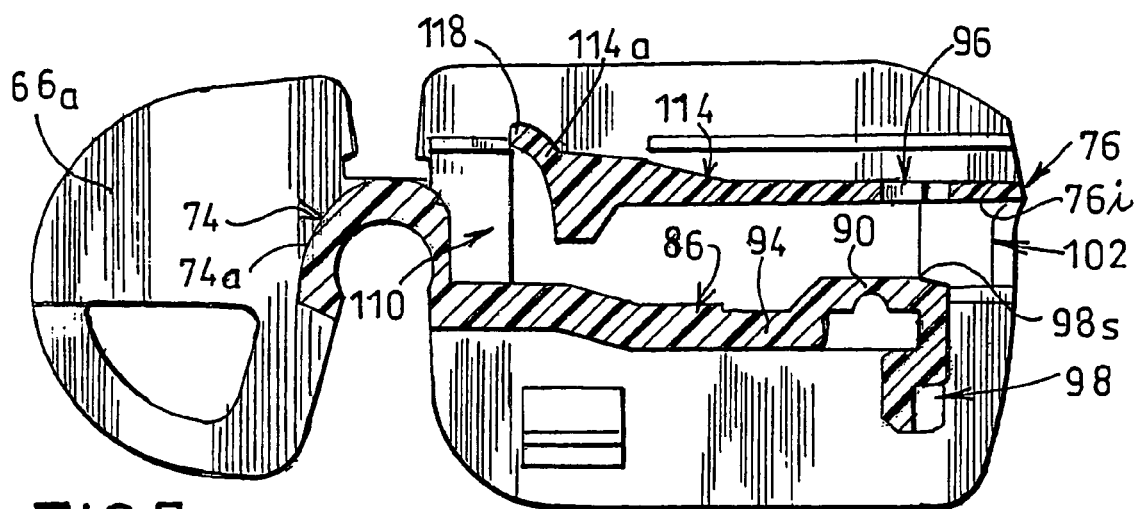
FIG.7
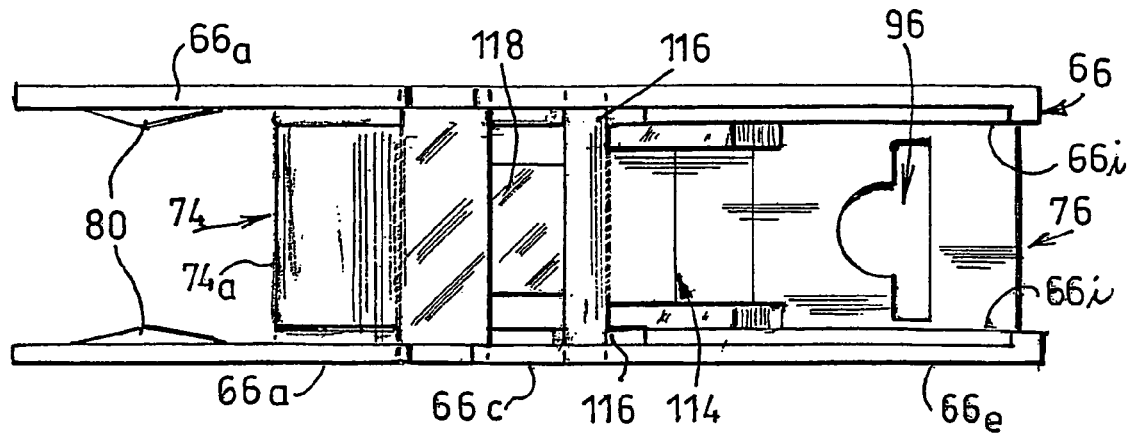
FIG.8
FIG.9
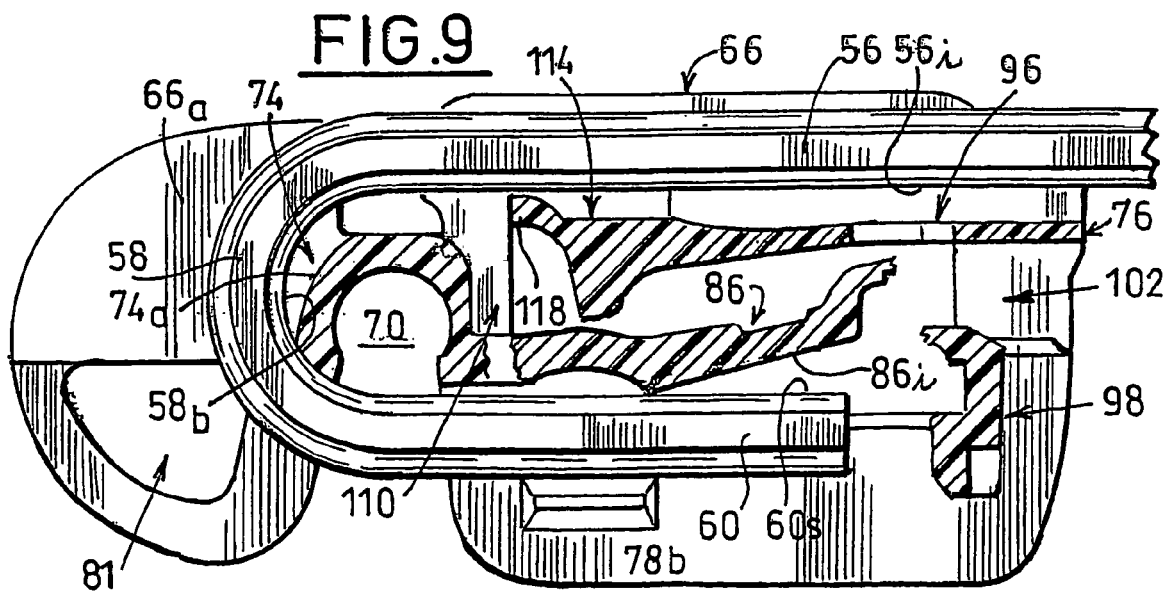

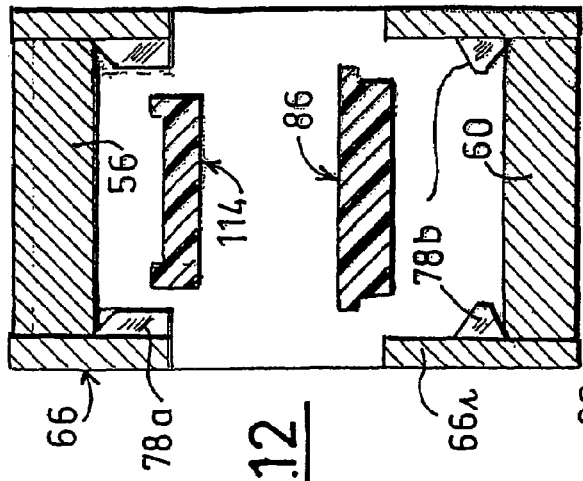
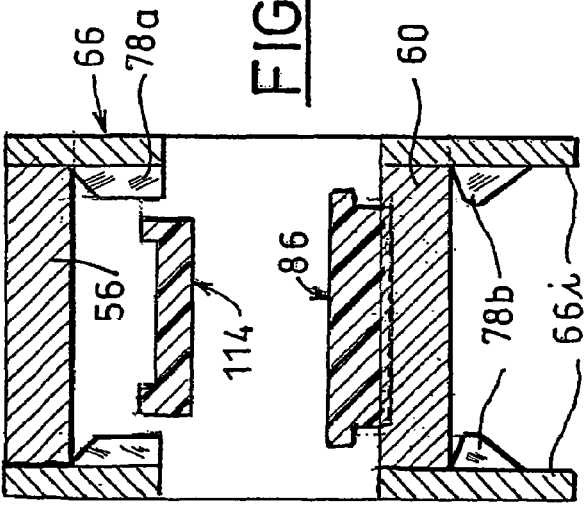
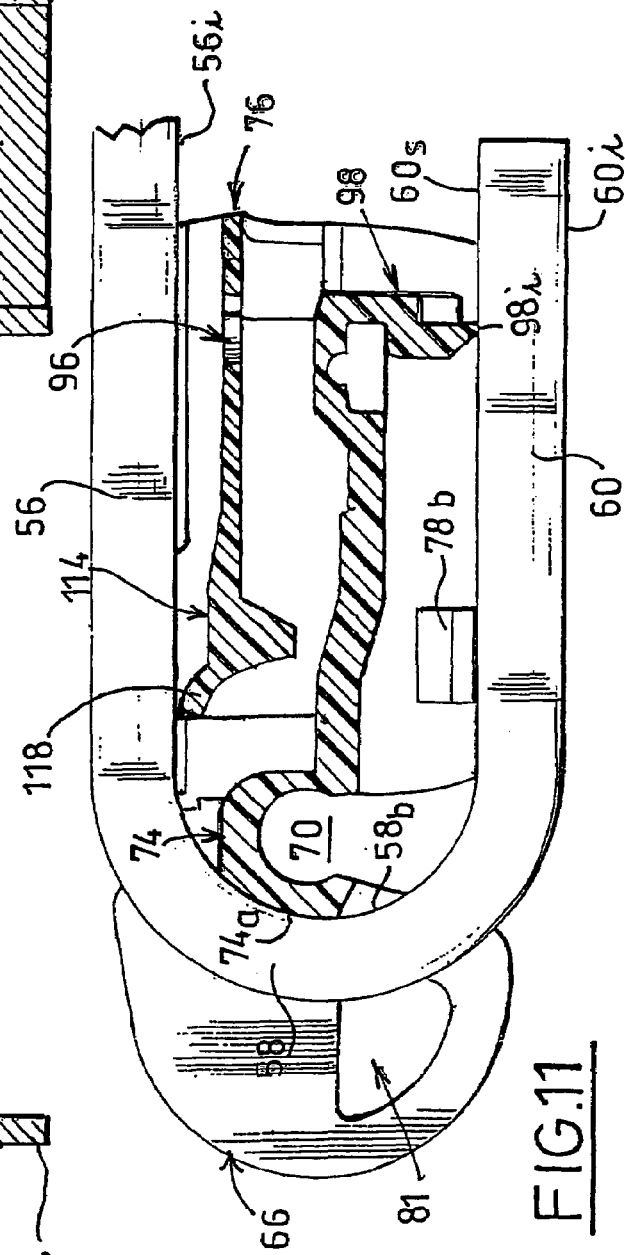

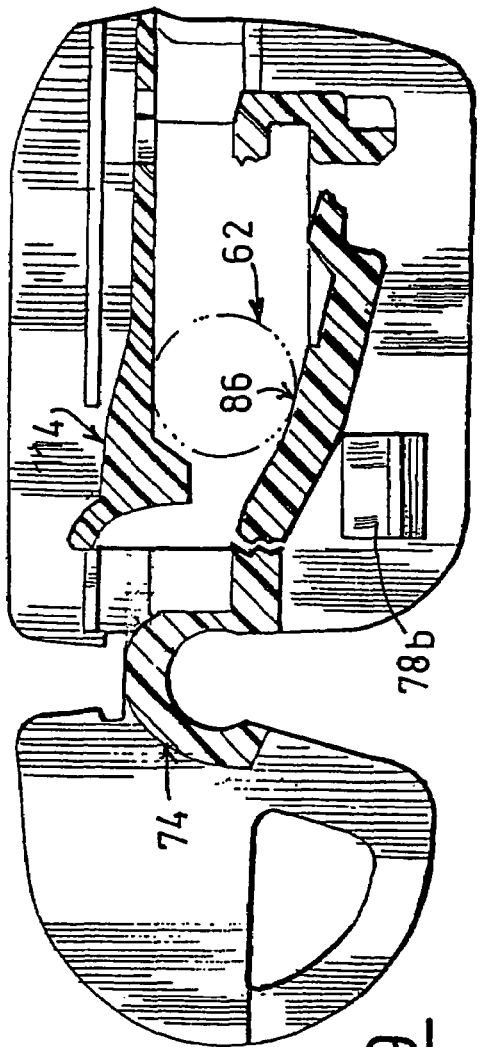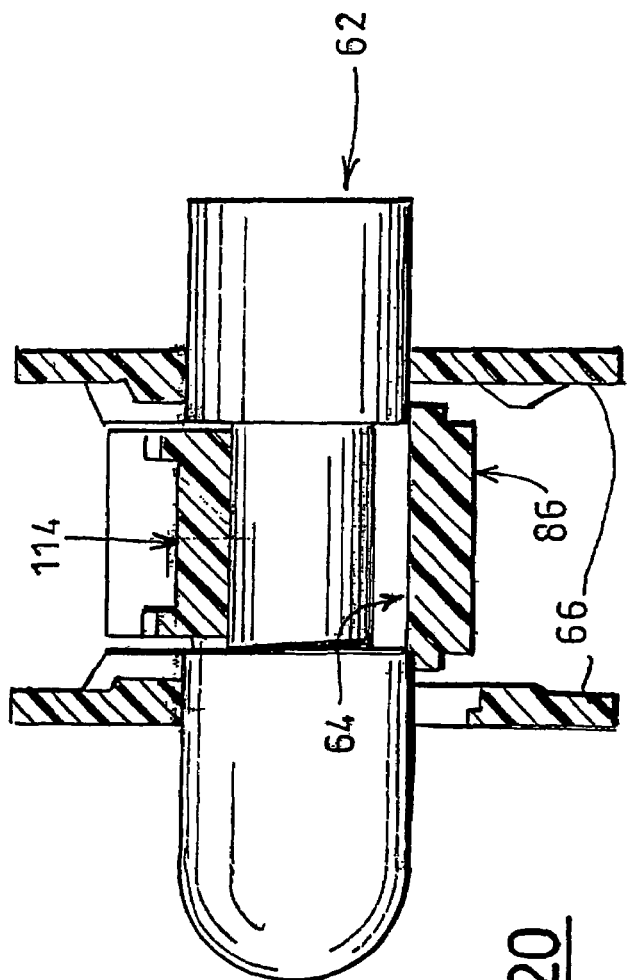

CONNECTOR WHICH IS USED TO JOIN A WINDSCREEN WIPER ARM TO A WIPER BLADE

BRIEF SUMMARY OF THE INVENTION

The present invention relates to a connection piece or "connector" used for connecting the end of a windshield wiper arm to an element of a support structure for supporting the wiper blade proper of the wiper blade unit.

The invention relates more particularly to a connector for connecting one end of a windshield wiper arm to a first transverse hinge pin belonging to a structure element of a wiper blade unit, the connector being of the type having two parallel vertical side cheek plates that are interconnected by a body defining a first recess into which the first hinge pin can be inserted radially, the connector being of the type that is suitable for being received at least in part against the inside end wall of the end of an arm that belongs to a first category of arm, which end is in the form of a U-shaped hook, via an outside convex cylindrical face portion of the body and via shapes in relief provided on the facing inside vertical longitudinal faces of the side cheek plates, so that the connector is suitable for being received against the inside end walls of ends of arms belonging to the first category of arm and of different sizes, and the connector also being of the type that is suitable for receiving a second transverse pin that belongs to a second category of arm and that extends transversely from a side edge of the end of the arm to be received in a second cylindrical recess of the body into which recess the second pin can be inserted transversely, which recess is defined in part by a locking tongue that is elastically deformable and that extends substantially longitudinally, a first longitudinal end of which tongue is fastened to the body, the locking tongue being suitable for retracting and for enabling the second pin to be inserted, and for causing the second pin to be locked transversely in the position in which it is mounted in the second recess.

The increase in the numbers of types and of shapes of current motor vehicles is causing an increase in the number of categories of arm and an increase in the number sizes of arm for each category.

The locking tongue makes it possible, using the same connector, to connect the wiper blade unit to various categories of wiper arm, a first category being a category in which the end of the arm is U-shaped, and a second category being a category in which the end of the arm carries a transversely extending pin.

By means of the shapes in relief, the connector is particularly well adapted for receiving arms of the first category that can be of numerous different sizes. However, it is not adapted for receiving ends of arms of the second category that are of a plurality of sizes.

In a known design that is described in document WO-A-01.15946, the locking tongue is suitable for deforming elastically to receive the transverse pin on the end of the arm. Thus, in order for the connector to be suitable for receiving a second transverse pin of a larger size, i.e. of larger diameter, the locking tongue must be designed to deform through a larger amplitude.

This means that, when the connector receives a pin of a first size that is the smallest size, the amplitude through which the locking tongue deforms is small. Thus, the resilient return force enabling the locking tongue to be held in the peripheral groove in the pin is smaller than the force generated when the connector receives a pin of a second size that is greater than the first size.

In addition, due to the small dimensions of a pin of the first size, the depth of the groove that receives the locking tongue is relatively small, which means that the bearing surface area via which the tongue bears against the walls of the groove is also small.

Therefore, when the connector receives a pin of the first size, the locking achieved by the locking tongue is ineffective in comparison with the locking achieved when the connector receives a pin of the second size, for which the resilient return force and the bearing surface area via which the tongue bears against the walls of the groove are larger.

That is why it is proposed to use a connector adapted to each size of pin.

Since wiper blade units are elements that wear quickly, the user needs to replace them regularly. For that purpose, new wiper blade units accompanied by connectors are commercially available. Since manufacturers cannot know either the category or the size of the windshield wiper arm of the vehicle of the driver, manufacturers are therefore obliged to put a plurality of connectors in the same packaging that make it possible to connect a wiper blade unit to all of the categories and sizes of arms.

Of the connectors supplied in the packaging, only one will be used to connect the wiper blade unit to the wiper arm, and the others, which are of no use, will be discarded.

Thus, manufacturers are certain to sell connectors of which a portion will be thrown away automatically, thereby resulting in wastage of the raw material sold, which could have been used to manufacture other connectors.

To avoid that, an object of the invention is to provide a connector that, on its own, makes it possible to connect a wiper blade unit to one end of a wiper arm, from among a plurality of categories of arm and from among a plurality of sizes of arm.

To this end, the invention provides a connector of the above-described type, characterized in that the second longitudinal end of the locking tongue is normally connected to the body by a film of material, and in that the dimensions of the film are determined so that the second recess is suitable for receiving a second pin that can be of a first or of a second size, the second size being greater than the first size, and inserting a second pin of the second size causes the film of material to break.

According to other characteristics of the invention:

the body includes a front segment that defines the first recess, the front outside wall of the front segment being suitable for being received against the inside end wall of the U-shaped hook of the arm, and a rear segment that extends horizontally above the locking tongue, and whose horizontal top face defines a bearing face for bearing against a top branch of the U-shaped hook, and whose bottom face is provided with a concave portion that defines in part the second recess, in association with a facing concave portion of the top face of the locking tongue;

the connector includes a locking element that is suitable for being received in an annular groove formed in the cylindrical wall of a second pin of the first size or of the second size for locking the second pin transversely in the position in which it is mounted in the second recess;

the locking tongue exerts a resilient locking force on the second pin so as to prevent the locking element from disengaging from the annular groove;

the locking element consists of a lug that is carried by the locking tongue;

the second longitudinal end of the locking tongue is extended by a control tab for releasing the second pin;

the locking element consists of a lug that is carried by the body;

the connector includes a second tongue that is elastically deformable and that extends substantially longitudinally forwards from the front longitudinal end of the rear segment of the body, which tongue is suitable for retracting upwards to enable the second pin to be inserted, and is suitable for being received at least in part in the peripheral groove in the second pin so as to lock the second pin transversely, in association with the locking tongue;

the second tongue is of transverse width complementary to the width of the annular groove in the second pin;

the front longitudinal end of the locking tongue is fastened to the front segment;

the body also includes a rear bottom segment having a front face that is provided with a rib which is suitable for co-operating with the releasing tab so as to hold the locking tongue in a position in which the second recess is open;

the connector is suitable for receiving the end of a third category of arm, which end consists of a shaped-section member segment that extends substantially longitudinally forwards, in a third cylindrical recess of longitudinal major axis, and that is open in its rear face;

the third recess is formed in a separate part mounted on the connector and that is suitable for being fastened to the connector by co-operation between complementary shapes;

the front segment of the body is provided with a blind hole that is of longitudinal axis, that is open in its rear face, and that forms the front end of the third recess, and the bottom face of the rear segment and the top face of the rear bottom segment of the body, in combination with the inside vertical longitudinal faces of the side cheek plates, define a rear segment of the third recess;

the end of an arm belonging to the third category of arm is provided with a lug which projects upwards relative to the top face of the end of the arm, and which is suitable for being received in the access vertical orifice of the rear segment for longitudinally locking the end of the arm in the position in which it is mounted in the third recess;

a portion of the locking tongue is curved downwards so that, for at least one size of arm belonging to the first category of arm, and when the arm is in the assembled position, the film of material is broken and the locking tongue is deformed elastically upwards so as to exert a substantially vertical force downwards on the top face of a horizontal bottom segment of the end of the arm;

the side edges of the locking tongue are extended transversely outwards by rounded projections;

the second tongue is provided with two side studs disposed on either side of the front longitudinal end of the second tongue, which studs extend transversely towards the outside of the connector and pass through respective orifices in the associated side cheek plates so that the free end of each stud comes flush with the outside vertical face of the associated cheek plate;

the free front end of the second tongue is curved back downwards so that the end of an arm belonging to the third category of arm is inserted into the third recess; the second tongue is deformed elastically upwards, and the free front end of the second tongue exerts a return force directed substantially downwards on the top face of the end of the arm;

when an arm belonging to the third category of arm is in the position in which it is mounted in the third recess, each of the side studs is in vertical abutment against a top edge of the orifice of the associated cheek plate;

the free front end of the second tongue is extended upwards by a finger so that when the end of an arm belonging to the first category of arm is in the assembled position, the second tongue is deformed elastically downwards and acts via the finger to exert a return force directed substantially upwards on a bottom face of a horizontal top first segment of the end of the arm;

the front end segment of each cheek plate, which segment extends cantilevered out forwards from the body, is elastically deformable and, on its inside vertical longitudinal face, is provided with a ramp-forming abutment so as to retract when the end of an arm belonging to the first category of arm is inserted, and so as to lock the U-shaped hook in the position in which it is mounted around the body of the connector;

the ramp-forming abutment extends over a top portion of the front end segment of the associated cheek plate, and a bottom portion of the front end segment is provided with an opening for insertion of the U-shaped hook;

the shapes in relief comprise a rib provided on the inside vertical longitudinal face of each side plate of the connector, which rib extends longitudinally above the top face of the rear segment of the body for positioning the end of an arm belonging to the first category of arm;

the ribs are formed so that each of their top faces forms a vertical bearing surface for the top branch of the U-shaped hook of at least a first size of arm, and so that their facing vertical faces transversely position the top branch of the U-shaped hook of an arm of a second size;

the shapes in relief further comprise a second projection disposed vertically below the body so as to perform, at least in part, the positioning of the connector against the inside end wall of the end of an arm belonging to the first category of arm;

the second projection is formed so that its top face vertically positions the connector for a first size of arm, its bottom face vertically positions the connector for a second size of arm, and its inside vertical face transversely positions the connector for a third size of arm;

the bottom face of the locking tongue is provided with ribs for vertically and/or transversely positioning an arm of the first category and of at least one size;

each positioning rib extends substantially vertically downwards along a side edge of the bottom face of the locking tongue;

the projections of the locking tongue extend transversely so that the free transverse end of each projection comes flush with the outside vertical face of the associated cheek plate;

each projection is curved so that the curvature of its top face is substantially complementary to the outside cylindrical wall of a second pin of the second size;

the curvature of a top edge of the opening is substantially identical to the curvature of the outside cylindrical wall of a second pin of the second size;

each of the side studs has a bearing surface for bearing against the outside cylindrical surface of a second pin of the second size, which bearing surface is complementary to said outside cylindrical wall;

each cheek plate is provided with a notch which extends vertically downwards from the top edge of the associated cheek plate and which is complementary to a manipulator element for manipulating the connector;

the notch substantially forms an upside-down T-shape in which the bottom edge of the horizontal branch extends vertically above the top face of the front element of the body of the connector; and the ribs extend longitudinally forwards so as to extend to the front end of the front segment of the body of the connector.

Other characteristics and advantages of the invention will appear on reading the following detailed description which, in order to make it easier to understand, is given with reference to the accompanying figures, in which:

BRIEF DESCRIPTION OF THE DRAWING(S)

FIG. 7 is a view similar to that of FIG. 4, showing another embodiment of the connector;

FIG. 8 is a top view of the connector shown in FIG. 7;

FIG. 9 is a view similar to that of FIG. 7, in which an arm belonging to the first category of arm and of the first size is shown in the position in which it is mounted around the body of the connector;

FIG. 10 is a vertical cross-section of the connector and of the arm that are shown in FIG. 9, showing how the top and bottom branches of the U-shaped hook of the arm bear against said connector;

FIGS. 11 and 12 are views similar to that of FIGS. 9 and 10, in which an arm belonging to the first category of arm, and of the second size, is shown in the position in which it is mounted around the body of the connector;

FIGS. 19 and 20 are views similar to that of FIGS. 17 and 18, and in which an arm belonging to the second category of arm, and of the second size, is shown in a position in which it is mounted in the second recess of the connector;

DETAILED DESCRIPTION OF THE INVENTION

Figure 1:
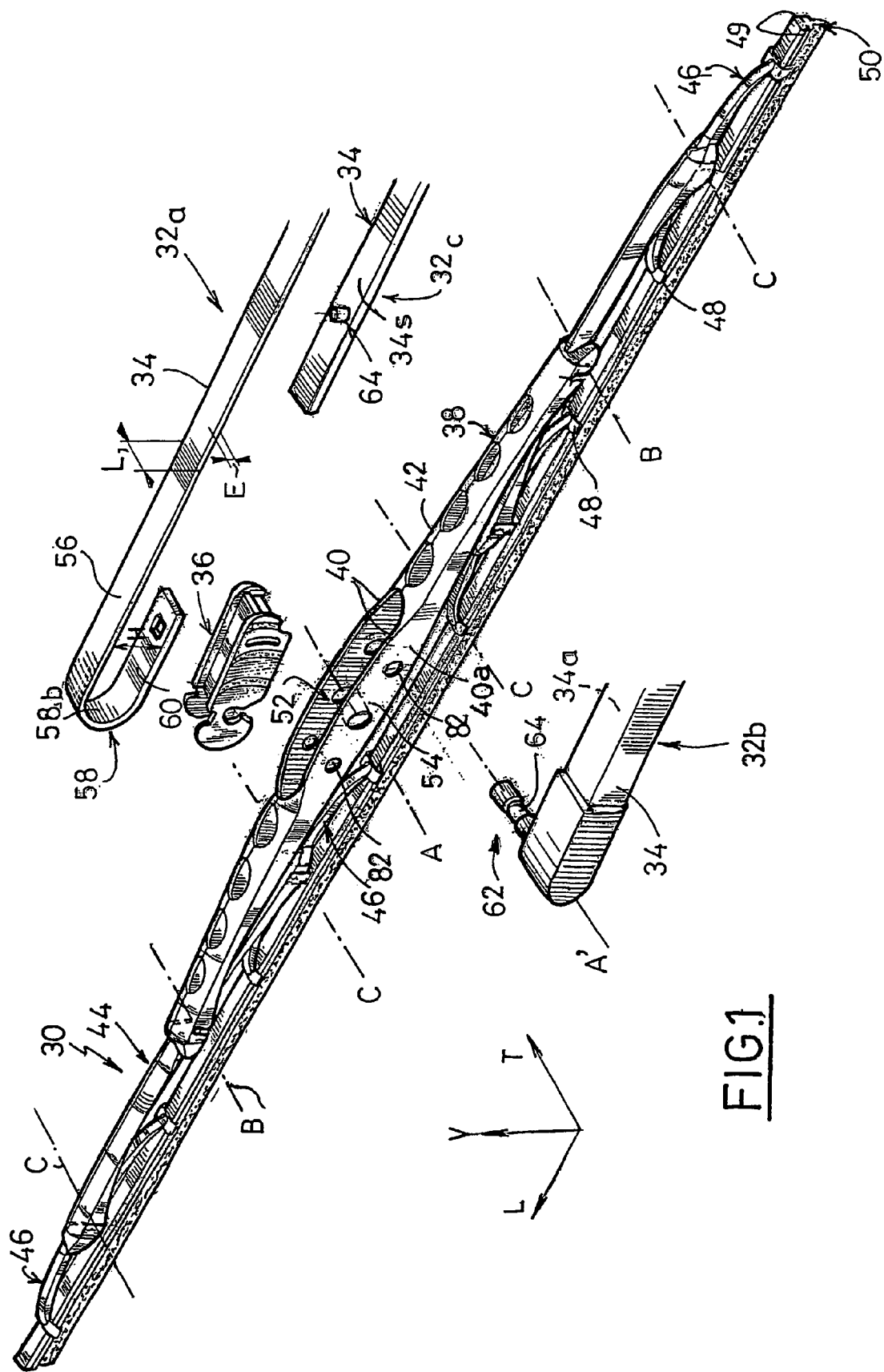
FIG. 1 is a diagrammatic exploded perspective view of a windshield wiper, showing a wiper blade unit and the various categories of arms that can be connected to the wiper blade unit via a connector of the invention.

For the description of the invention, the vertical, longitudinal, and transverse directions are adopted in non-limiting manner, using the frame of reference V, L, T indicated in FIG. 1.

The rear-to-front direction is also adopted as being the longitudinal direction, and from right to left with reference to FIG. 1.

In the following description, elements that are identical, similar or analogous are designated by like references.

FIG. 1 shows a wiper blade unit 30 designed to be mounted pivotally about a transverse axis A at the front longitudinal end 34 of a windshield wiper arm 32a, 32b, 32c via an adapter connector 36.

The wiper blade unit 30 has a main bracket 38 provided with two parallel longitudinal flanges 40 interconnected by a transverse top back 42.

At each of its longitudinal ends, the main bracket 38 carries yokes 44 mounted pivotally about transverse axes B and themselves carrying secondary yokes 46 at their ends, which secondary yokes are mounted pivotally about transverse axes C.

At its longitudinal ends, each of the secondary yokes 46 is provided with fastening claws 48 for fastening to metal spine members 49 for supporting a wiper blade proper 50 made of a flexible elastomer material.

The main bracket 38, the yokes 44 and the secondary yokes 46 form a hinged structure that is deformable in a longitudinal plane that lies substantially perpendicular to the general plane of the glazing to be wiped (not shown), and which, by means of the spine members 49, makes it possible to press the blade proper 50 over its entire length against the glazing while distributing the contact pressure uniformly between the wiper blade proper 50 and the glazing over the entire length of the wiper blade unit 30.

In its central portion, the main bracket 38 of the wiper blade unit 30 is provided with a top opening 52 formed in its top back 42 and in which a transverse rod 54 is provided that interconnects the two flanges 40 and that forms a first transverse axis A about which the wiper blade unit 30 is mounted pivotally relative to the wiper arm 32a, 32b, 32c.

FIG. 1 also shows the free ends 34 of three different windshield wiper arms 32a, 32b, 32c, each of which represents a category of windshield wiper arm existing on current motor vehicles, each of which is suitable for receiving the wiper blade unit 30 via the same connector 36.

A first category of arm 32a is constituted by a type of arm that has its end in the form of a U-shaped hook, and comprising a horizontal top branch 56 extending substantially horizontally forwards, a curved C-shaped intermediate branch 58 whose top end is connected to the front longitudinal end of the top branch 56, and a horizontal bottom branch 60 that extends longitudinally rearwards from the bottom end of the intermediate branch 58.

The arms 32a of said first category can be of a plurality of sizes, each of which is defined by the width L and by the thickness E of each branch. In the following description, reference is made to three different arm sizes. For each size, the group (L; E; H) formed by the values in millimeters (mm) of the width L, of the thickness E, and of the height H of the hook is a respective one of the following groups: (9; 3; 6.7); (9; 4; 10.7); and (8; 3; 6.7).

A second category of arm 32b is constituted by a type of arm that has its end 34 extending longitudinally forwards and carrying, on one of its side faces 34a, a transverse pin 62 having an outside cylindrical surface that is provided with a peripheral groove 64 of rectangular section. The arms 32b of the second category can be of a first size or of a second size, each size corresponding to a respective outside diameter for the pin 62. In the following description, the arm 32b of the first size is the arm for which the outside diameter of the pin 62 is the smaller, i.e. 4.8 mm in this example, and the arm 32b of the second size is the arm for which the outside diameter of the pin 62 is the larger, i.e. 6.35 mm in this example.

Finally, a third category of arm 32c is constituted by a type of arm that has its end 34 consisting of a single horizontal longitudinal segment of rectangular cross-section, and carrying a projecting lug 64 on its top face 34s.

The connector 36 makes it possible to connect the wiper blade unit 30 to any of the arms 32a, 32b, 32c belonging to the respective categories of arms and of any one of the above-mentioned sizes.

In a known manner, the connector 36 is formed in one piece by molding, generally by molding a plastics material.

Figure 2:
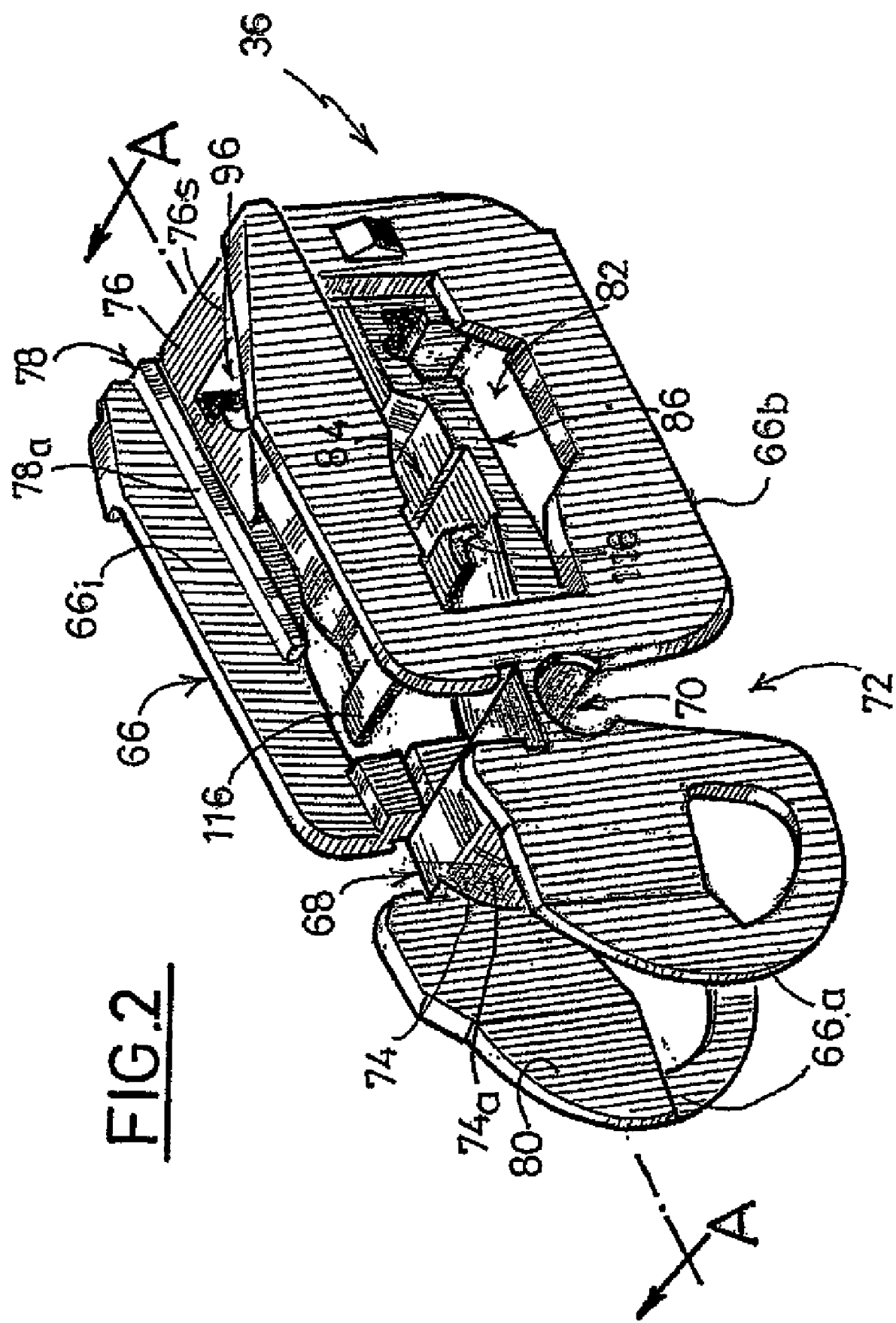
FIG. 2 shows a detail on a larger scale of the connector of the invention shown in FIG. 1.
Figure 2A:
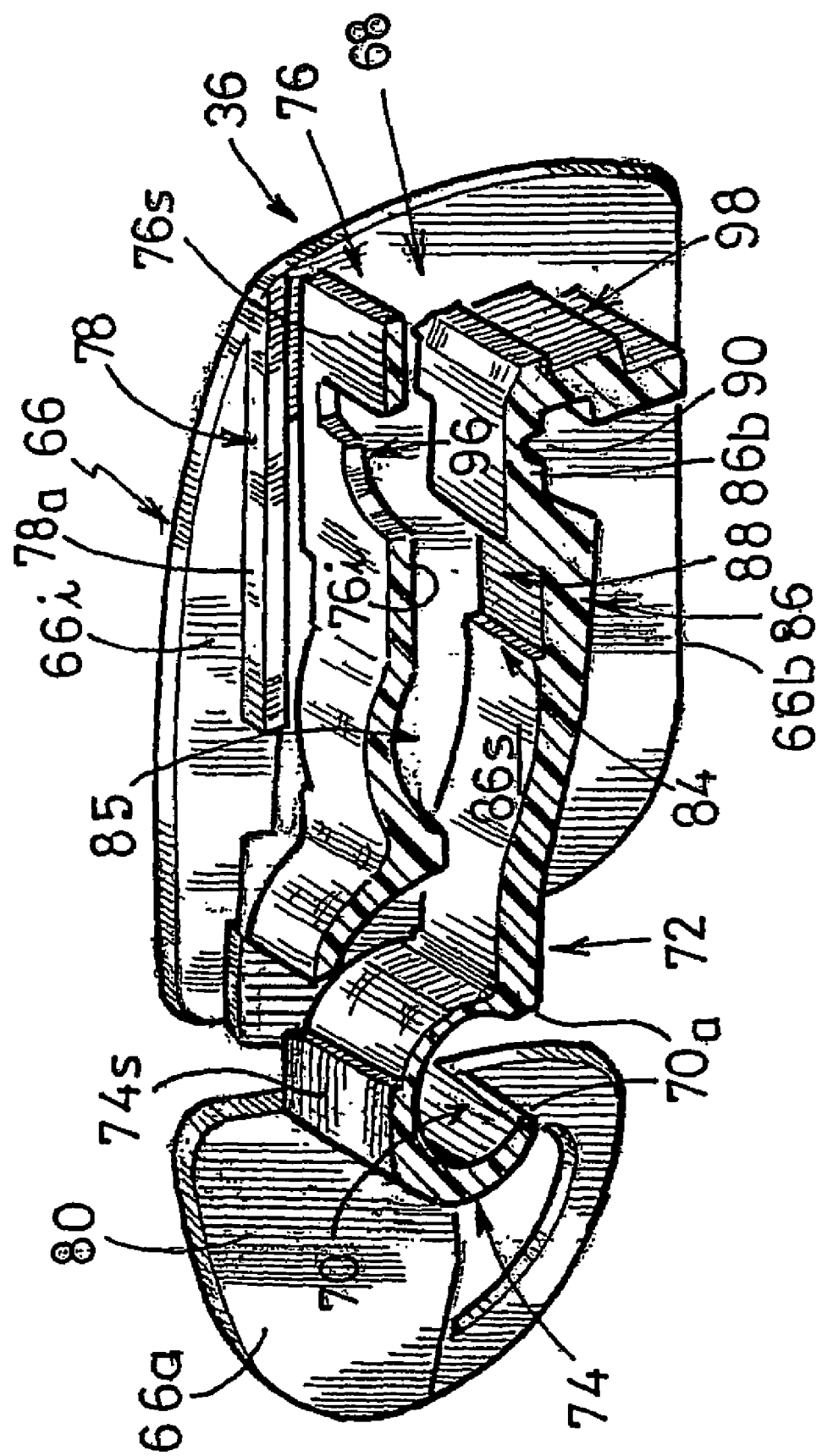
FIG. 2A is a perspective view of a section on line A-A of the connector shown in FIG. 2.

As can be seen in greater details in FIGS. 2 and 2a, the connector includes two parallel vertical side cheek plates 66 that are designed to be received snugly through the opening 52 in the back 42 of the main bracket 38, between the two flanges 40 of the main bracket 38, so as to position the connector 36 transversely relative to the main bracket 38 of the wiper blade unit 30.

The two side cheek plates 66 are interconnected by a transverse body 68 which defines a first cylindrical recess 70 that is complementary to the first hinge pin 54, and into which the first hinge pin can be inserted radially.

For this purpose, the first recess is open along its bottom transverse generator line, and each of the two cheek plates 66 is provided with an opening 72 that extends vertically downwards from the first recess 70 to the bottom edge 66b of the associated cheek plate 66. The longitudinal dimension of the first recess 70 is determined so that the distance between its longitudinal edges 70a is less than the outside diameter of the first hinge pin 54, the first hinge pin 54 being inserted into the first recess 70 by the body 68 deforming elastically.

As can be seen in greater detail, in particular in FIG. 2A, the body 68 is made up of a front first segment 74 that defines the first recess 70 and of a rear second segment 76 that extends longitudinally and horizontally behind the front segment 74 so that its top face 76s is disposed substantially at the same height, in the vertical direction, as the top face 74s of the front segment 74.

In order to connect the wiper blade unit 30 to an arm 32a belonging to the first category of arm, the body 68 of the connector 36 is suitable for being received against the inside end wall of the end of the arm 32a in the form of a U-shaped hook, the two cheek plates 66 of the connector 36 being disposed transversely on either side of the end 34 of the arm 32a.

For this purpose, the front cylindrical face 74a of the front segment 74 is convex and is so shaped that, when the connector 36 is received in the end 34 of the arm 32a, at least one transverse generator line of the front cylindrical face 74a is in contact with the concave rear cylindrical face 58b of the intermediate branch 58 of the arm 32a.

In addition, shapes in relief 78 are provided on the inside vertical longitudinal faces 66i facing the side cheek plates 66 for positioning the connector 36 vertically and transversely relative to the end 34 of the arm 32a.

The shapes in relief 78 comprise firstly a rib 78a that extends longitudinally above the top face 76s of the rear segment of the body, and behind the top face 74s of the front segment 74 of the body 68.

The two ribs 78a have rectangular dimensions, which are determined so that the distance between their facing vertical longitudinal faces is equal to the smallest width L of arm, i.e. 8 mm in this example.

Figure 13:
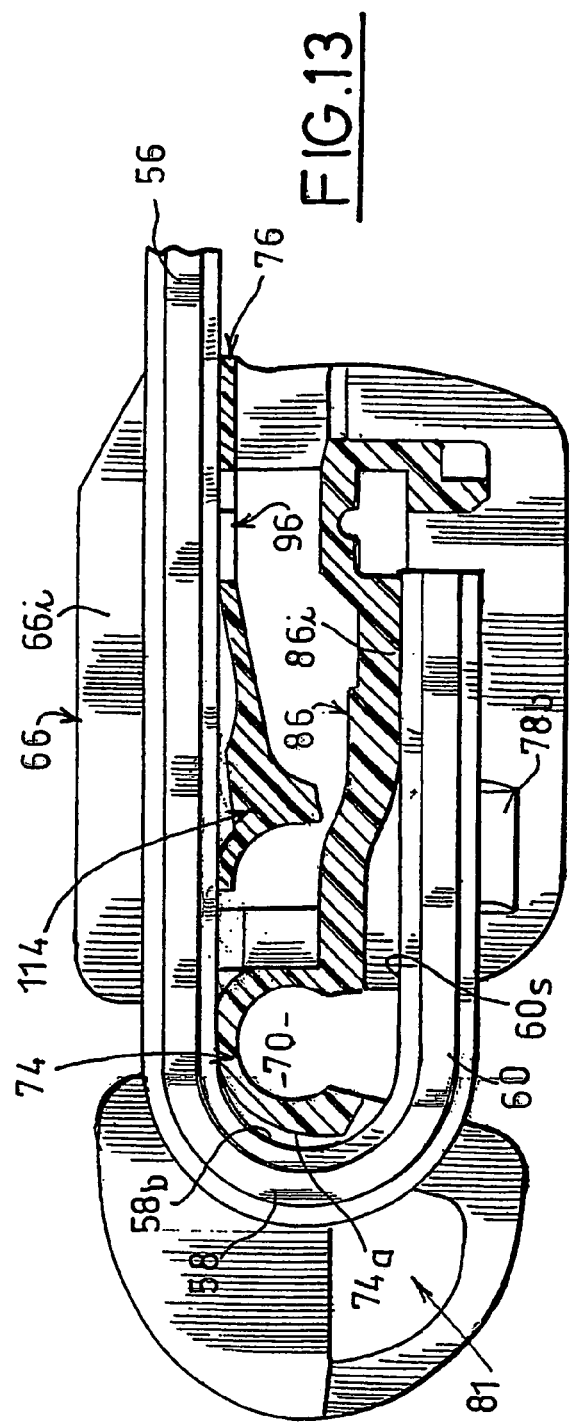
FIGS. 13 and 14 are views similar to that of FIGS. 9 and 10, and in which an arm belonging to the first category of arm, and of the third size, is shown in a position in which it is mounted around the body of the connector.
Figure 14:
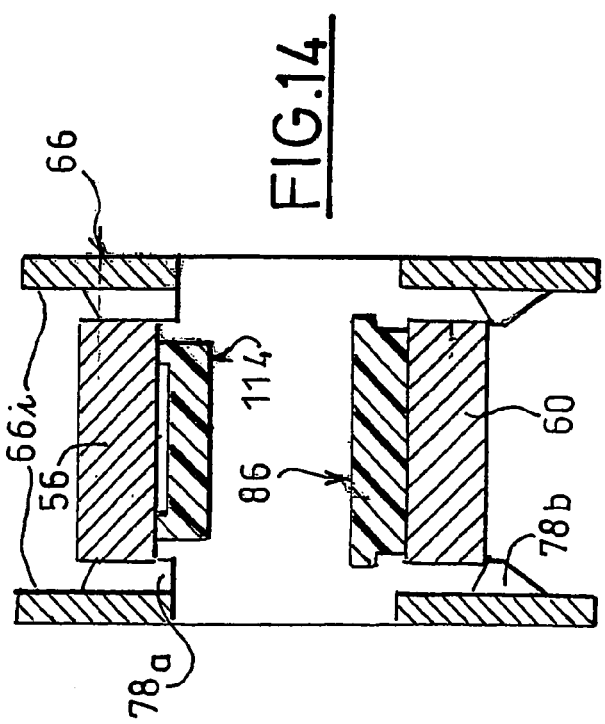

Thus, as shown in FIGS. 9 to 11, when the U-shaped hook 34 is in the position in which it is mounted around the body 68 of the connector 36, the top branch 34 of the U-shaped hook bears against the top horizontal longitudinal faces of the two ribs 78a when the width L of the arm 32a is the largest, so as to position the U-shaped hook vertically. Also, as shown in FIGS. 13 and 14, the top branch 56 of the U-shaped hook bears against the top face 76s of the rear segment when the width L of the arm is the smallest width.

The shapes in relief 78 further comprise a projection 78b formed on the inside vertical longitudinal face 66i of each cheek plate 66, provided vertically below the body 68 of the connector 36, and of V-shaped vertical cross-section so as to position the bottom branch 60 of the U-shaped end of the arm 32a vertically and/or transversely.

Thus, as shown in FIGS. 9 and 10, for the first size of arm 32a, the bottom branch 60 of the U-shaped hook bears against the top faces of the two projections 78b, for the second size of arm 32a, the side edges of the bottom branch 60 of the U-shaped arm bear against the bottom faces of the two projections 78b, and for the third size of arm 32a, the bottom branch 60 of the U-shaped hook bears against the transverse ends of each projection 78b.

Figure 15:
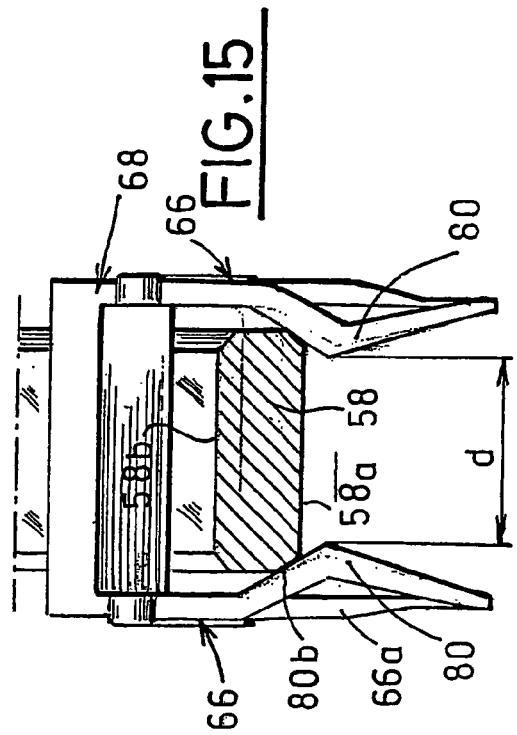
FIG. 15 is a view from above and on a larger scale of the front end of the connector and of the arm that are shown in FIG. 9, showing how the front face of the curved intermediate branch of the U-shaped hook bears against the ramp-forming abutments of the connector.

Finally, as shown in FIG. 15, in order to lock the U-shaped hook in the position in which it is mounted around the body 68 of the connector 36, each cheek plate 66 extends longitudinally in front of the body 68 and, on its inside vertical longitudinal face 66i, it is provided with a ramp-forming abutment whose dimensions are determined so that the distance "d" between the inside ends of the two ramps 80 is less than the smallest width L of the arm 32a.

Each abutment 80 consists of a portion of the cheek plate 66 that is deformed towards the inside of the connector 36, in V-shaped manner. Thus, the abutment 80 keeps a thickness identical to the thickness of the associated cheek plate 66. This is a major advantage when the connector 36 is formed by molding because the abutment 80 has no extra thickness that might be detrimental to its strength.

In addition, as can be seen in particular in FIGS. 9, 11, and 13, the abutment 80 extends over the top portion of the front segment 66a of the associated cheek plate 66, and the bottom portion of the front segment 66a of the cheek plate 66 is provided with an opening 81.

By means of this opening 81, on inserting the U-shaped hook around the body 68, the bottom branch 60 of the U-shaped hook does not come into contact with the abutments 80. This makes it possible to position the U-shaped hook vertically relative to the body 68 of the connector 36, without the user having to perform complex manipulations, and before the U-shaped hook is finally inserted around the body 68 of the connector 36.

The front end 66a of each cheek plate 66 that extends cantilevered out in front of the body 68 is elastically deformable so that, while the U-shaped hook is being inserted around the body 68 of the connector 36, the front segments 66A of the two cheek plates 66 deform elastically by moving apart from each other, and, when the U-shaped hook is in the position in which it is mounted around the body 68 of the connector 36, the front segments 66a of the two cheek plates 66 return resiliently to their original shapes so that the ramp-forming abutments 80 longitudinally lock the U-shaped hook in the position in which it is mounted around the body 68 of the connector 36.

Also, the ramp-forming abutments 80 are arranged longitudinally on the inside faces 66i of the cheek plates 66 so that, when the U-shaped hook is in the position in which it is mounted around the body 68 of the connector 36, the front face 58a of the curved intermediate branch 58 of the U-shaped hook bears against the rear face 80b of each abutment 80, regardless of the size of the arm 32a.

The complex shapes of the connector 36 make it difficult to manufacture. As regards the projections 78b, the molding constraints require them to be positioned at different longitudinal design dimensions.

Figure 21:
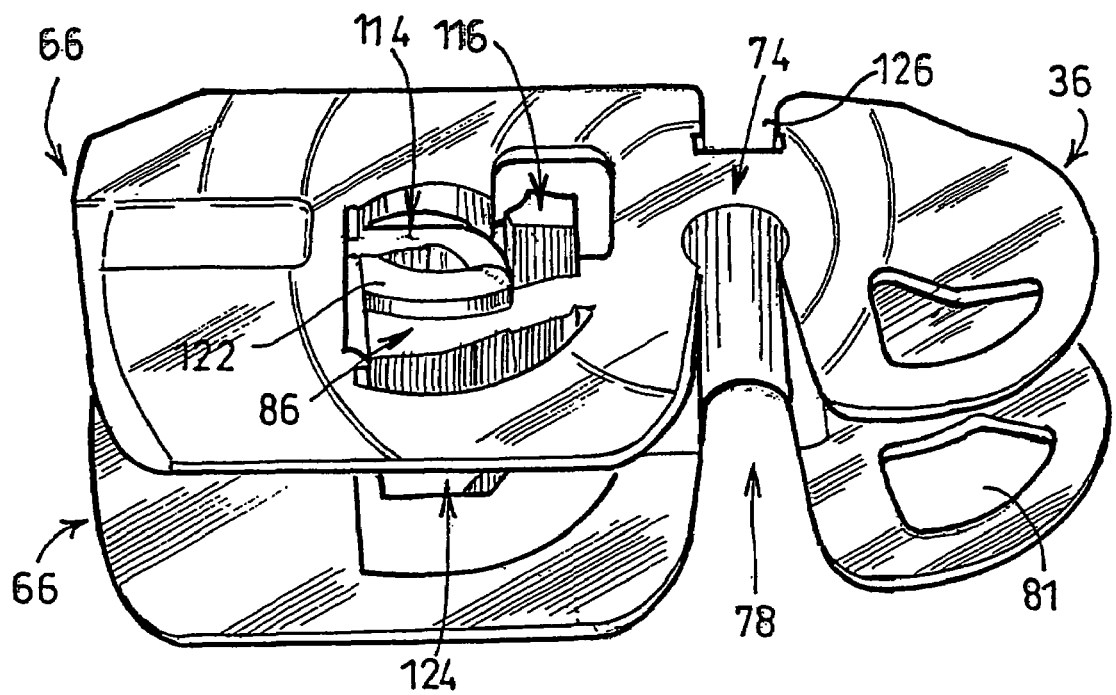
FIG. 21 is a diagrammatic perspective view of another variant embodiment of a connector of the invention.
Figure 22:
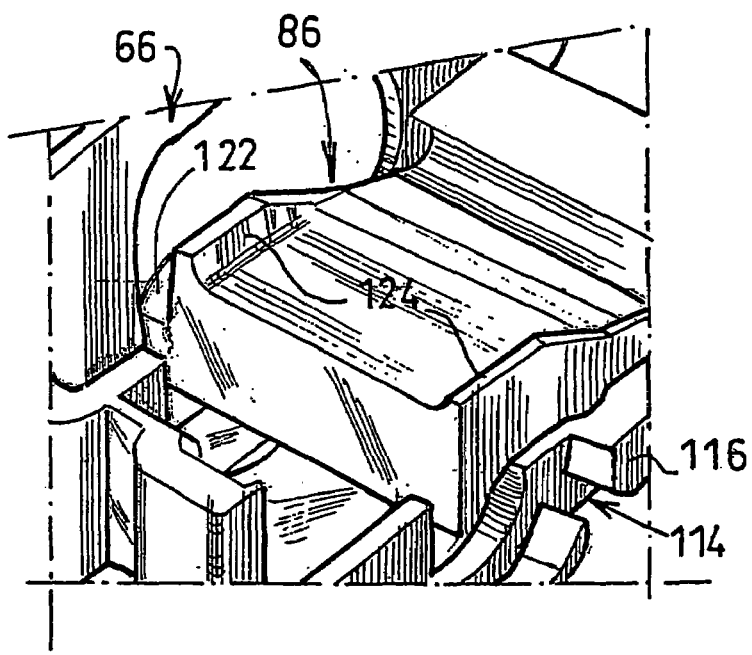
FIG. 22 is a perspective detailed bottom view and on a larger scale of the locking tongue shown in FIG. 21.

FIGS. 21 and 22 show another embodiment of the connector 36. In this embodiment, the positioning function of the projections 78b is performed by positioning ribs 124 on the locking tongue 86, which ribs extend vertically downwards along each side edge of the locking tongue 86.

The distance between the positioning ribs 124 is equal to the width L of an arm of the third size, i.e. equal to 8 mm. As a result, when an arm 32a of the third size is in the position in which it is assembled with the connector 36, the bottom branch 60 of the U-shaped hook is received between the positioning ribs 124, and the top face 60s is in abutment against the bottom face 86i of the locking tongue 86.

The arm 32a of the third size is positioned vertically and transversely by the positioning ribs 124 and by the locking tongue 86.

When an arm 32b belonging to the second category of arm is connected to the wiper blade unit 30, its transverse pin 62, which is referred to below as the "second transverse pin", passes through a hole 82 having at least the same dimensions, which hole is provided in each longitudinal flange 40 of the main bracket 38, the side face 34a of the arm 32b that carries the second hinge pin 62 coming into abutment against the facing vertical longitudinal face 40a of a flange 40 of the bracket 38.

Thus, the wiper blade unit 30 is hinged to the arm 32a to pivot about a second transverse axis A' defined by the second pin 62 of the arm 32b. The function of the connector 36 is then merely to lock the second pin 62 transversely relative the wiper blade unit 30.

As can be seen in FIGS. 2 and 2A, the body 68 of the connector 36 defines a second cylindrical recess 84 of transverse axis and into which the second pin 62 can be inserted transversely. The second recess 84 in the body 68 is defined in part by the bottom face 76i of the rear segment 76 of the body 68, which face is provided with a concave portion 85, and it is also defined in part by a locking tongue 86 which extends longitudinally rearwards from the front segment 74 of the body 68, facing the rear segment 76 of the body 68, the top face 86s of the tongue being provided with a concave portion 88 facing the concave portion 85 of the rear segment 76.

The locking tongue 86 is elastically deformable so as to retract to enable the second pin 62 to be inserted into the second recess 84, and, when the second pin 62 is in the position in which it is mounted in the second recess 84, it is suitable for exerting a locking force that tends to press the second pin 62 against the bottom face 76i of the rear segment 76 of the body 68.

In order to lock the second pin 62 relative to the wiper blade unit 30, the connector 36 has a locking element that is suitable for being received in part in the peripheral groove 64 in the second pin 62 when said second pin is in the position in which it is mounted in the second recess.

Figure 3:
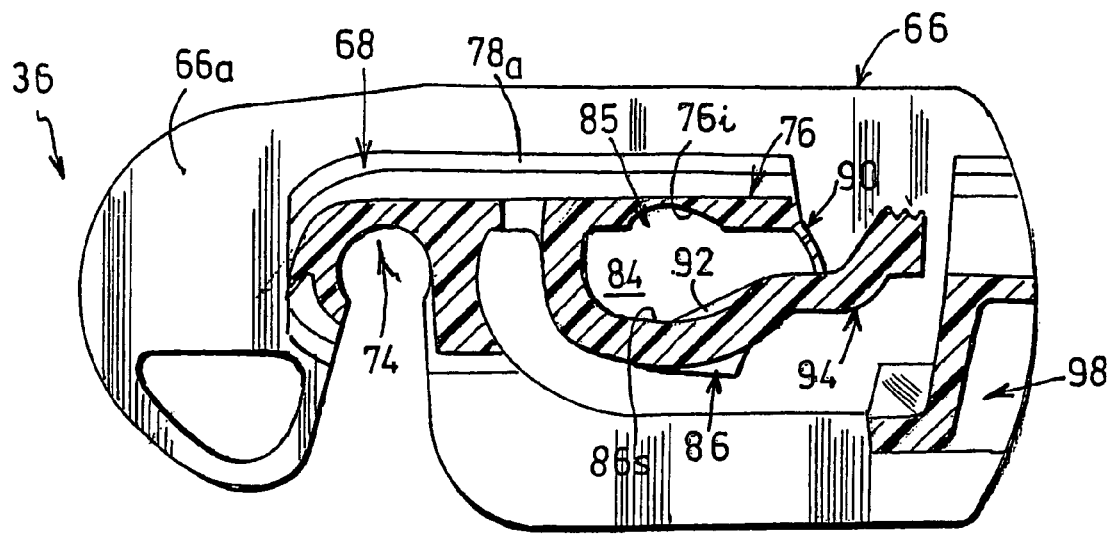
FIG. 3 is a longitudinal vertical section view of the connector shown in FIG. 1, in a first embodiment of the invention.

In a first embodiment, shown in FIG. 3, the locking member consists of a locking lug 92 which is carried by the top face 86s of the locking tongue 86.

In a second embodiment (not shown), the locking element is carried by the bottom face 76i of the rear segment 76 of the body 68.

Finally, in a third embodiment of the connector, shown in particular in FIGS. 2 and 7, the locking element consists of a second tongue 114 which is also elastically deformable and which extends longitudinally forwards from the front longitudinal end of the rear segment 76 of the body 68 of the connector 36, and, in a preferred embodiment, the front longitudinal end 114a of the second tongue 114 is provided longitudinally behind the front segment 74 of the body 36.

The second tongue 114 is elastically deformable so as to retract upwards to enable a second pin 62 to be inserted, and so as to be received at least in part in the peripheral groove 64 in the second pin 62 so as to lock the second pin 62 transversely, in association with the locking tongue 86.

For this purpose, the transverse width of the second tongue 114 is complementary to the width of the annular groove 64 in the second pin 62.

In addition, as shown in FIGS. 2 and 8, in order to limit the deformation of the second tongue 114 in the horizontal plane, the front longitudinal end 114a of the second tongue 114 is provided with two side studs 116 disposed on either side of the second tongue 114 and that extend transversely towards the outside of the connector 36 while passing through an opening 82 associated with each cheek plate 66 of the connector 36 so that the free transverse end of each side stud 116 is flush with the outside longitudinal vertical face 66e of the associated cheek plate 66.

Thus, when the connector is in the position in which it is mounted through the opening 52 in the back 42 of the main bracket 38 of the wiper blade unit 30, the free end of each side stud 116 is in abutment against the inside vertical longitudinal face of a flange 40 of the main bracket 42 of the wiper blade unit 30, thereby transversely locking the second tongue 114.

In the invention, and as shown in the figures, the rear longitudinal end 86b of the locking tongue 86 is normally connected to the body 68 via a film of material 90.

The mechanical characteristics of the film of material 90, i.e. its resistance to rupture, are determined such that inserting a second pin 62 of the second size into the second recess 84 in the connector 36 causes the locking tongue 86 to deform elastically downwards through a large amplitude, thereby causing the film of material 90 to break.

In addition, the mechanical characteristics of the film of material 90 are determined so that inserting a second pin 62 of the first size into the second recess 84 does not cause the film of material 90 to break, the locking tongue 86 then being connected to the body 68 via its two ends 86a, 86b, thereby reducing its range of movement.

When the locking tongue 86 is connected to the body 68 via its two longitudinal ends 86a, 86b, inserting a second pin 62 of the first size causes the locking tongue 86 to deform at each of its ends 86a, 86b, thereby resulting in high stiffness for the locking tongue 86.

Thus, when a second pin 62 of the first size is in position in the second recess 84, the locking tongue 86 exerts a radial force on the second axis 62 that is larger when it is connected to the body 68 via both of its ends 86a, 86b than when it is connected to the body 68 via a single end 86a.

Regardless of the size of the second pin 62, the locking tongue 86 exerts a resilient force on the second pin 62, which resilient force is sufficiently large to prevent a transverse force between the arm 32b and the blade unit 30 from causing, via the locking element, the locking tongue 86 to deform downwards and thus from causing the locking element to disengage from the groove 64 in the second pin 62.

However, when it is desired to release the wiper blade unit from the wiper arm 32b, it is necessary to move the second pin 62 transversely in the second recess 84 of the connector 36.

That is why the rear longitudinal end 86b of the locking tongue 86 is extended by a control tab 94 for releasing the second pin 62 and that enables a user to cause the locking tongue 86 to be deformed downwards, thereby enabling the locking lug 92 or the second tongue 114 to disengage from the annular grove 64 in the second pin 62, so that the second pin 62 is no longer prevented from moving transversely.

Figure 6A:
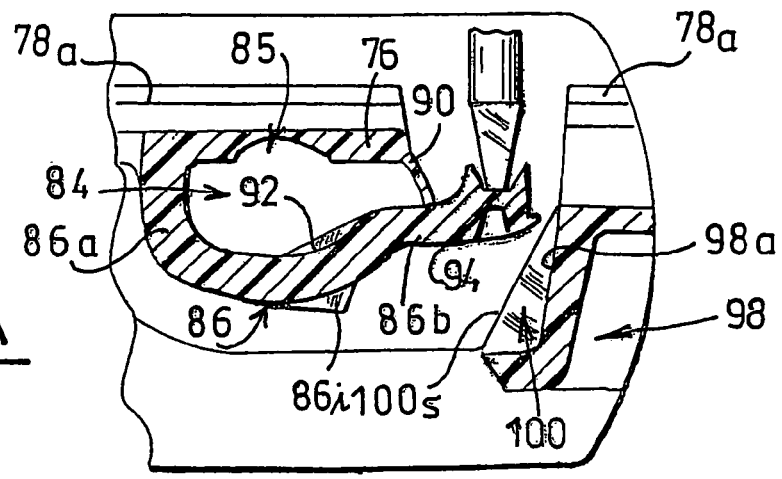
FIGS. 6a to 6c are vertical longitudinal section views on a larger scale of the rear portion of the body of the connector, showing the various positions of the control tab relative to the rear bottom segment of the body of the connector.
Figure 6B:
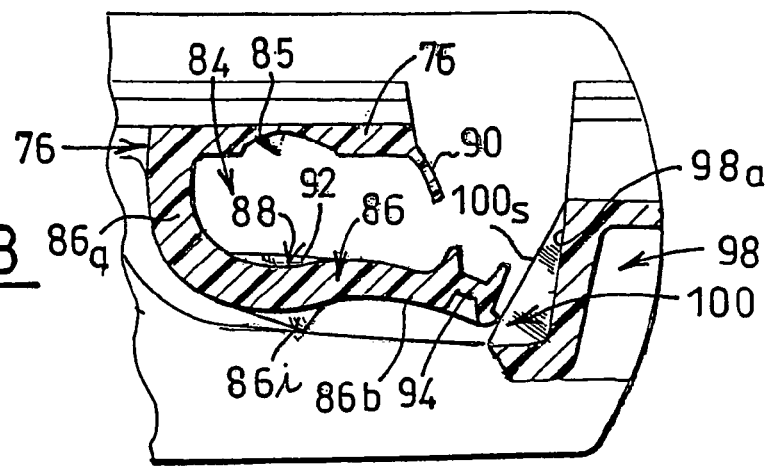
Figure 6C:
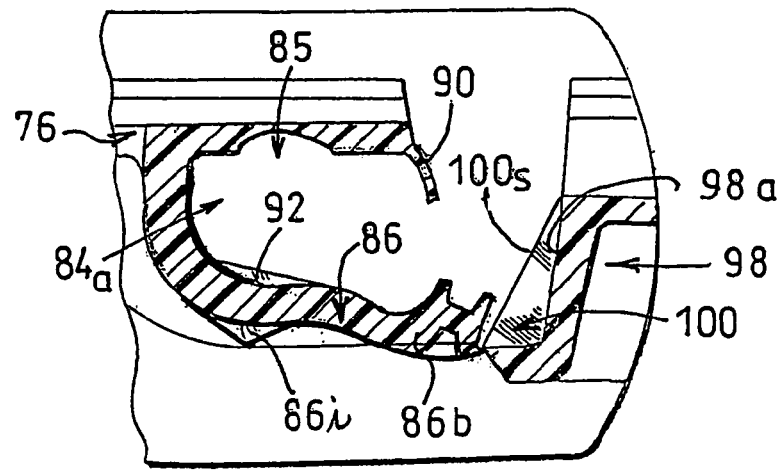

As shown in FIGS. 6A to 6C, the control tab 94 extends longitudinally rearwards from the rear longitudinal end 86b of the locking tongue 86, so that action on the control tab 94 consisting of a force directed substantially vertically downwards causes the locking tongue 86 to be deformed downwards to an extent sufficient to enable the locking tongue 86 or the locking lug 92 to be disengaged from the annular groove 64.

When the second pin 62 which is received in the second recess 84 of the connector 36 is of the first size, the locking tongue 86 is then connected to the body 68 of the connector 36 by both of its ends 86a, 86b, and action on the control tab 94 then causes the film of material 90 to break so as to enable the locking tongue 86 to deform to a large extent.

In order to increase the stiffness of the connector 36, as shown in particular in FIGS. 7 and 8, the rear segment 76 of the body 68 of the connector 36 extends longitudinally rearwards beyond the control tab 94, in a manner such as to prevent access thereto.

Access to the control tab 94 is then via the bottom portion of the connector 36, which can be particularly awkward for the user.

That is why, as shown in particular in FIGS. 2 and 7, the free front longitudinal end 114a of the second tongue 114 is extended by a finger 118 which extends substantially upwards beyond the top face of the front segment 74 of the body.

The user can then take hold of the finger 118 to cause the second tongue 114 to be elastically deformed upwards until it is disengaged from the groove 64 in the second pin 62.

In another variant embodiment of the invention, the body 68 of the connector 36 has a rear bottom third segment 98 that makes it possible firstly to increase the stiffness of the connector 36, and which secondly locks the locking tongue 86 in two positions shown in FIGS. 6B and 6C, making it possible respectively to lock the second pin 62 and to remove said second pin.

For this purpose, the front face 98a of the rear bottom segment is provided with a rib 100 which extends longitudinally forwards, and which has a top face 100s against which the rear longitudinal end 86b of the locking tongue 86 comes into abutment when a second pin 62 of the second size is inserted into the second recess 84. The locking tongue 86 is then locked in a first position in which it locks the second pin 62, and in which movement of the rear longitudinal end 86b of the locking tongue 86 is limited to make it possible to exert a radial force on the second pin 62 that is larger.

In addition, manual action on the control tab 94 causes the rear longitudinal end 86b of the locking tongue 86 to be moved to a larger extent so that it comes to be positioned below the rear bottom segment 98 of the body 68. The locking tongue 86 is then itself locked in a second position enabling the second pin 62 to be removed.

The vertical longitudinal walls of the annular groove 64 generally form right angles relative to the outside cylindrical wall of the second pin 62. Thus, when it is desired that the second pin 62 be inserted into or withdrawn from the second recess 84 of the connector 36, the longitudinal edge of the locking tongue 86 comes into abutment against a vertical wall of the groove 64, making it difficult to insert or to remove the second pin 62.

Figure 18:
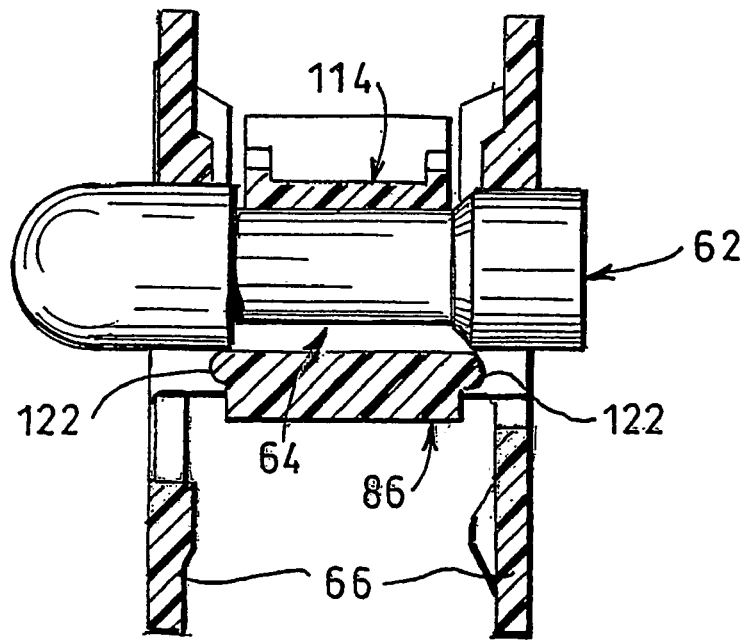

That is why, in a variant embodiment of the invention shown in FIG. 18, the side edges of the locking tongue 86 are extended transversely towards the outside of the connector 36 by rounded projections 122 which make it possible to facilitate deformation of the locking tongue 86 when inserting or extracting the second pin 62.

In order to connect the wiper blade unit 30 to an arm 32c belonging to the third category of arm, the connector 36 is provided with a third recess 102 that is substantially cylindrical but of rectangular cross-section that is complementary to the cross-section of the arm 32c, whose major axis is longitudinal and which is open in its rear face so that the end 34 of the arm 32c can be inserted longitudinally forwards.

Figure 4:
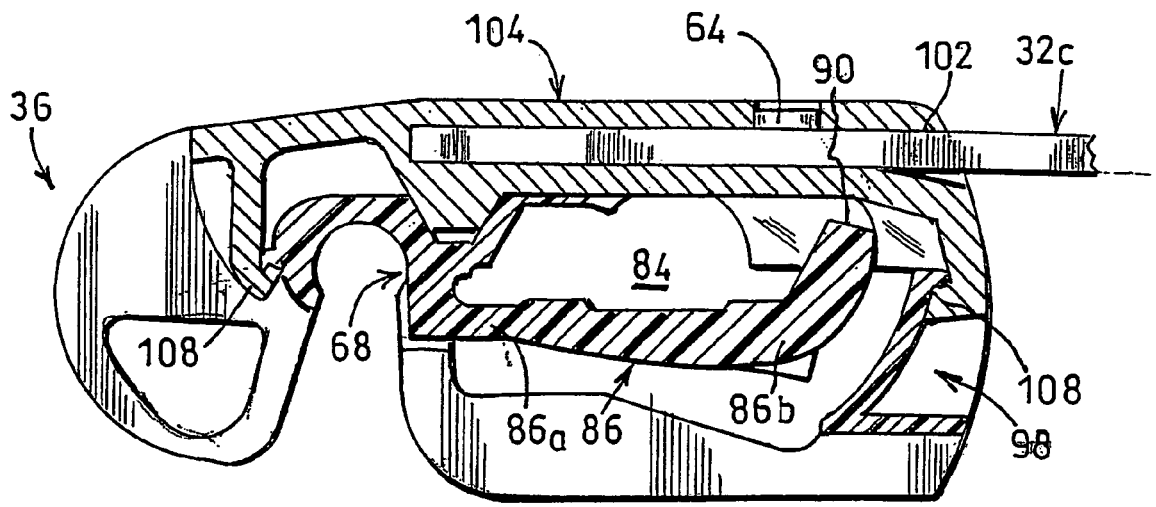
FIG. 4 is a view similar to that of FIG. 3, and in which the separate piece inside which the third recess is formed is fastened to the connector.
Figure 5:
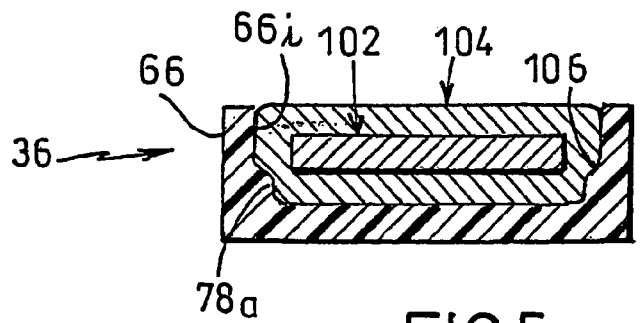
FIG. 5 is a vertical cross-section view on line V-V of the connector shown in FIG. 4.

In a first embodiment of the third cylindrical recess 102, shown in FIGS. 4 and 5, said third recess is formed in a separate part 104 that is fastened to the body 68 of the connector 36 by co-operation between complementary shapes.

As can be seen in FIG. 5, the transverse dimensions of the separate part 104 are complementary to the transverse dimensions of the connector 36 so that the separate part 104 is received without any transverse clearance between the inside faces 66i of the cheek plates 66 of the connector 36.

Also, the separate part 104 is provided with shapes in relief 106 that co-operate with complementary shapes in relief 78a of the connector 36 for longitudinally and vertically positioning the separate part 104 on the connector 36. Finally, the separate part is provided with elastically deformable catches 108 for locking it in the position in which it is mounted on the body 68 of the connector 36.

Figure 16:
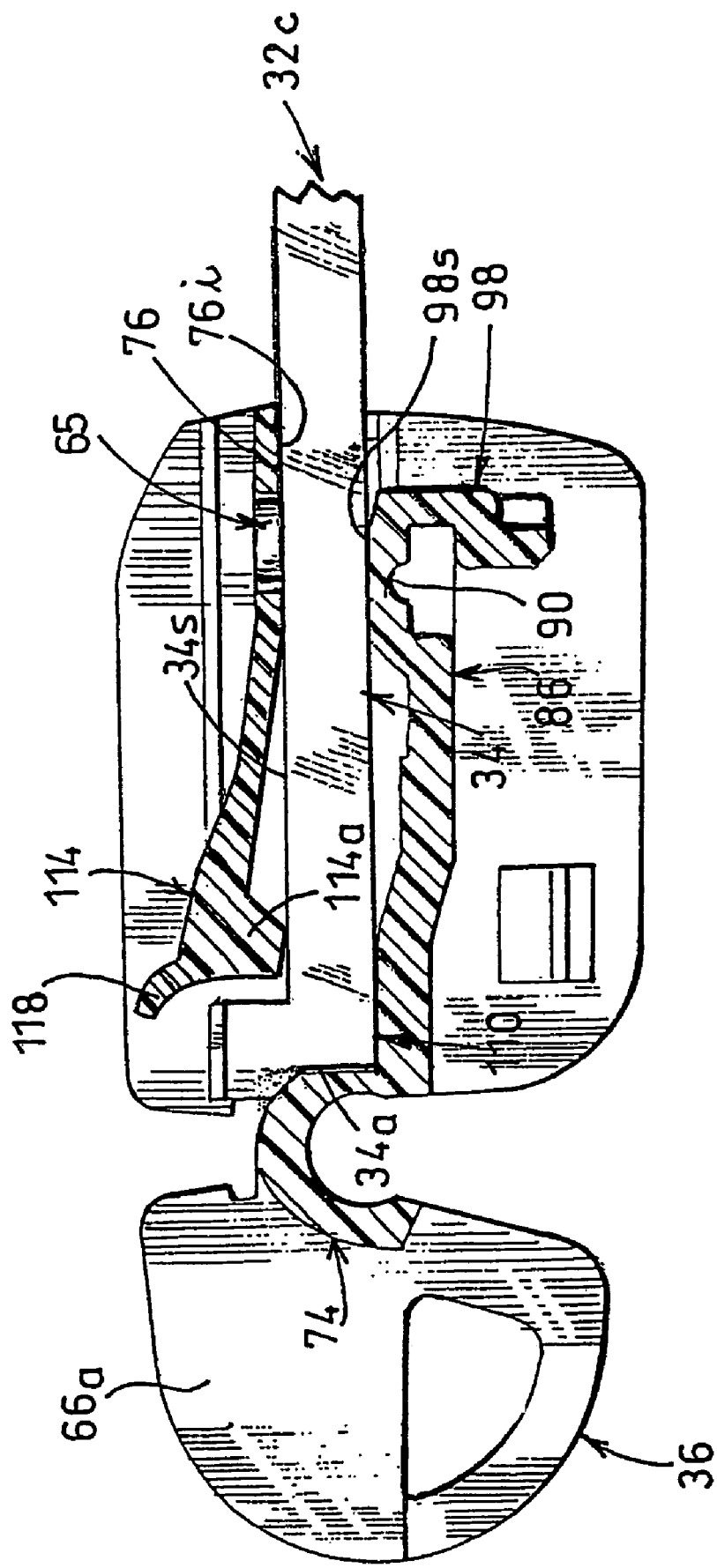
FIG. 16 is a view similar to that of FIG. 9 and in which an arm belonging to the third category of arm is shown in the position in which it is mounted in the third recess of the connector.
Figure 17:
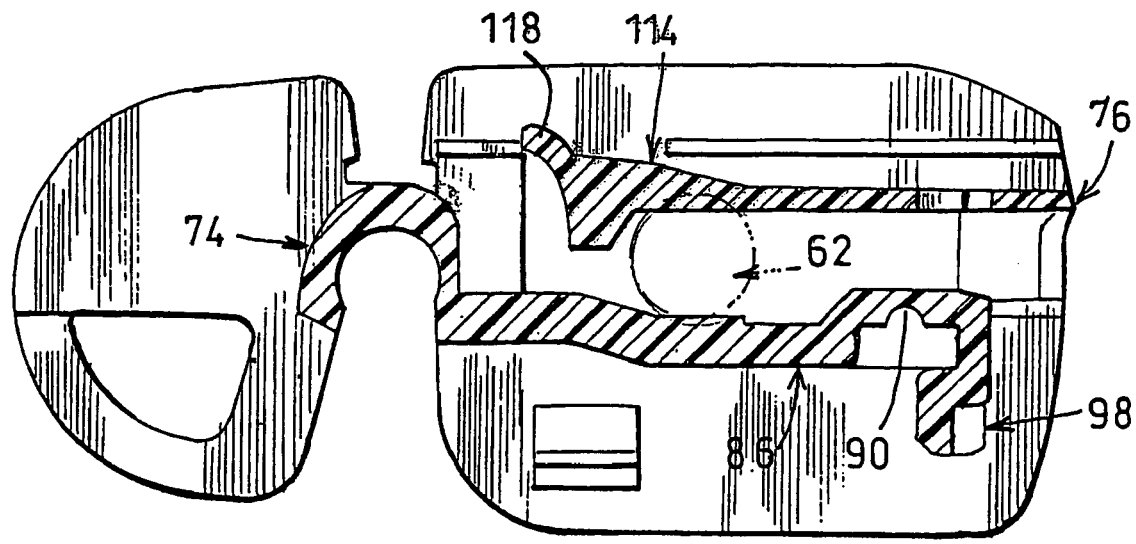
FIGS. 17 and 18 are views similar to that of FIGS. 9 and 10, and in which an arm belonging to the second category of arm, and of the first size, is shown in a position in which it is mounted in the second recess of the connector.

In another embodiment of the third recess 102, shown in particular in FIGS. 7 and 16, said recess is formed in the body 68 of the connector 36 so that each segment 74, 76, 98 of the body 68 defines the third recess 102 in part.

Thus, the front segment 74 of the body 68 is provided with a notch 110 of longitudinal axis and that is open in its rear face so as to form the front end of the third recess 102. The bottom face 76i of the rear segment 76 and the top face 98s of the rear bottom segment 98 of the body 68 have respective horizontal portions that define respective ones of the top face and of the bottom face of the third recess 102.

Finally, the facing inside vertical longitudinal faces 66i of the cheek plates 66 of the connector 36 define the side walls of the third recess 102.

In a known embodiment, an arm 32c belonging to the third category of arm is longitudinally locked by means of a lug 65 projecting upwards relative to the top face 34s of the end 34 of the arm 32c and that is disposed longitudinally at a standard distance from the front end face 34a of the arm. Said lug 65 is received in a complementary orifice 96 of the connector.

In general, the connector 36 is designed with dimensional differences so as to enable an arm 32a, 32b, 32c to be mounted without any major difficulty.

However, once the arm 32a, 32b, 32c is in the position in which it is assembled with the connector 36, the dimensional differences result in clearance between the connector 36 and the arm 32a, 32b, 32c, and, when the windshield wiper is in use, that clearance is the source of premature wear on the wiper blade proper 50, or of unpleasant noise.

That is why clearance take-up means are provided for taking up the clearance between the arms 32a, 32b, 32c and the connector 36, which means make it possible to limit, or even to reduce such vibration.

As can be seen in FIGS. 9 and 13, a first embodiment of said clearance take-up means consists of a bottom portion 86i of the locking tongue 86 that is curved downwards, so that, when an arm 32a belonging to the first category of arms is in the position in which it is mounted around the body 68 of the connector 36, the locking tongue 86 exerts a force directed downwards on the top face 60s of the horizontal bottom segment 60 of the U-shaped hook.

Thus, for the first size, i.e., in this example, (9; 3; 6.7), as shown in FIG. 9, the film of material 90 is broken and the locking tongue 86 is deformed elastically upwards so as to exert a downward resilient return force on the top face 60s of the horizontal bottom segment 60 of the U-shaped hook.

For the third size of arm, i.e. (8; 3; 6.7), as shown in FIG. 13, the film of material 90 does not break, and the locking tongue 86 is elastically deformed upwards to a small extent so as to exert a downward resilient return force on the top face 60s of the horizontal bottom segment 60 of the U-shaped hook.

In another embodiment of the invention, shown in FIGS. 7 to 20, the clearance take-up means are implemented by means of the second tongue 114 which is itself also elastically deformable.

The front longitudinal end 114a of the second tongue 114 is curved back downwards so that, when the end 34 of an arm 32c belonging to the third category of arm is in the position in which it is mounted in the third recess 102 of the body 68, the free front end 114a of the second tongue 114 is in contact with the top face 34s of the end 34 of the arm 32c, and the second tongue 114 is deformed upwards.

The upward deformation of the second tongue 114 is limited by the fact that the side studs 116 come vertically upwards into abutment against a top edge 82a of the opening 82.

Thus, as shown in FIG. 16, the second tongue 114 exerts a return force that is directed substantially downwards on the top face 34s of the end 34 of the arm 32c, thereby making it possible to take up clearance between the connector 36 and an arm 32c belonging to the third category of arm, and to prevent the arm 32c from pivoting relative to the connector 36.

The finger 118 of the second tongue 114 also makes it possible to take up clearance by coming into abutment against the bottom longitudinal face 56i of the top branch 56 of the U-shaped hook of an arm 32a belonging to the first category of arm, and for at least one of the three sizes of arm 32a.

Thus, as shown in FIGS. 9, 11, and 13, when the end 34 of an arm 32a belonging to the first category of arm is in the position in which it is mounted around the body 68 of the connector 36, the second tongue 114 is deformed elastically downwards, and, via the finger 118, it exerts a return force that is directed substantially upwards on the bottom face 56i of the horizontal top segment 56 of the end 34 of the arm 32a, thereby making it possible to take up the clearance.

As indicated above, the second tongue 114 is suitable for deforming upwards or downwards as a function of the category of arm 32a, 32b, 32c. As far as possible, the openings 82 in the cheek plates 66, which openings pass the studs 116 of the second tongue 114, extend vertically so as to allow the studs 116 to move vertically upwards and downwards on inserting the end 34 of an arm 32a, 32b, 32c.

However, in order to limit the amplitude of the upward movement of the second tongue 114 when inserting an arm 32b belonging to the second category of arm, the openings 82 of the cheek plates 66 are dimensioned so that the studs 116 of the second tongue 114 come vertically upwards into abutment against the respective top edges 82a of the associated opening 82.

Thus, the deformation of the second tongue 114 remains less than the elastic limit of the material, which makes it possible to use the connector again for connecting the arm 32c to a new wiper blade unit 30.

The cheek plates 66 of the connector 36 are described above as each having two openings 82 that pass respectively the second pin 62 of an arm 32b belonging to the second category of arm, and a side stud 116 of the second tongue 114. However, it should be understood that each cheek plate 66 can be provided with a single opening 82 which consists of the above-described openings joined together.

When the wiper mechanism is operating, and when an arm 32b of the second category is connected to the wiper blade unit 30 via the connector 36, the second pin 62 pivots in the second recess 84.

The second pin 62 of the second size is of large dimensions, its peripheral surface area is thus also large. Thus, while it is moving in the second recess 84, the friction between the second pin 62 and the associated walls of the connector 36 causes major wear on said associated walls.

That wear is a source of considerable amounts of play between the second pin 62 and the connector 36, it being possible for such play to cause the locking element to be disengaged from the groove 64 of the second pin 62 and thus to cause the arm 32b to be disunited from the wiper blade unit 30.

In another variant embodiment of the invention, and as shown in FIGS. 22 to 26, the areas of contact between the connector 36 and the second pin 62 of the second size are larger than the areas of contact between the connector 36 and a second pin 62 of the first size.

In a first aspect of this variant embodiment, the areas of contact are increased at the locking tongue 86.

Figure 25:
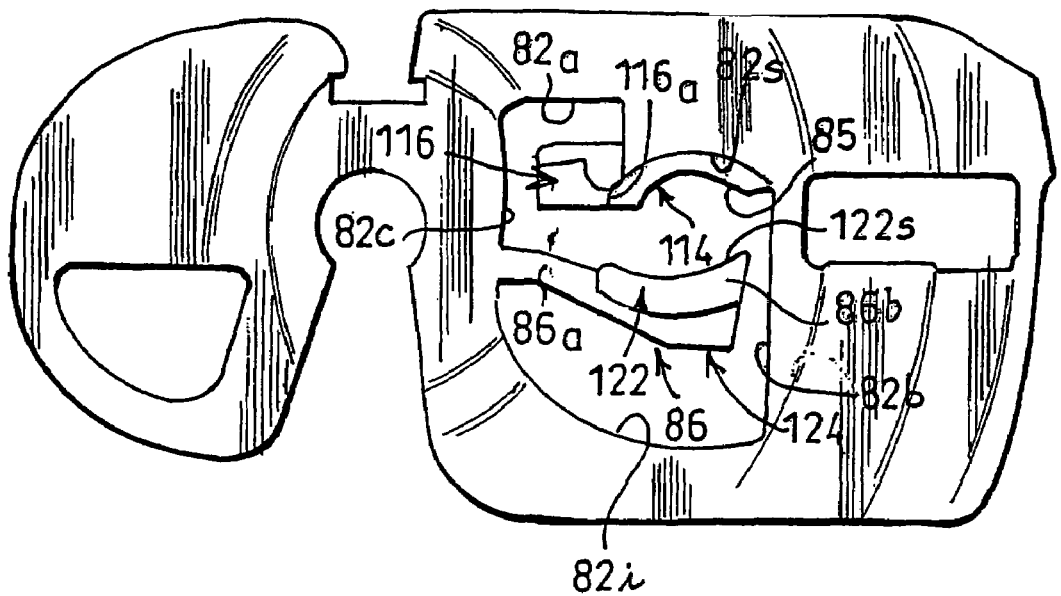
FIG. 25 is a side view of the connector shown in FIG. 21.
Figure 26:
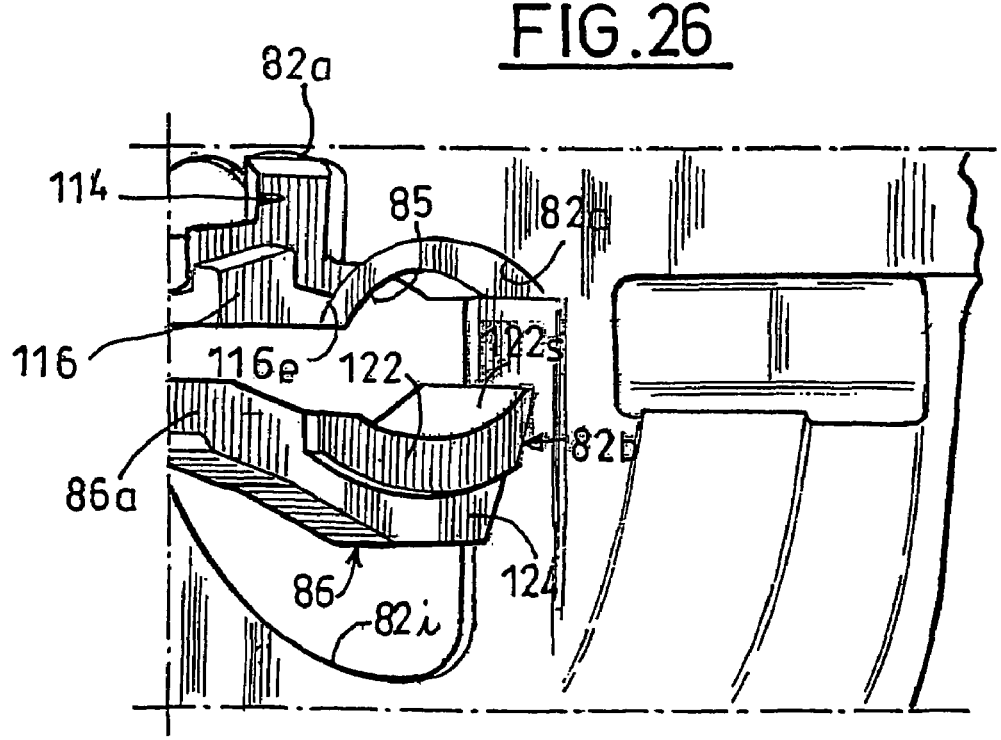
FIG. 26 is a perspective view of the connector shown in FIG. 21.

For this purpose, as can be seen in FIG. 25, the top face 86s of the locking tongue 86 is convex, and it is complementary to the outside cylindrical surface of the second pin 62.

Also, the projections 122 of the locking tongue 86 extend transversely so that their free transverse ends come flush with the outside vertical longitudinal faces 66e of the respective associated cheek plates 66. In addition, the projections 122 are curved so that their top faces 122s are also complementary to the outside cylindrical surface of the second pin 62.

Another surface of contact between the second pin 62 and the connector 36 is situated at a top edge 82s of the opening 82 in each cheek 66. Thus, as shown in FIGS. 22 and 23, the top edge 82s of each opening 82, against which edge the second pin 62 bears, is also curved so as to be complementary to the outside cylindrical surface of the second pin 62.

Figure 23:
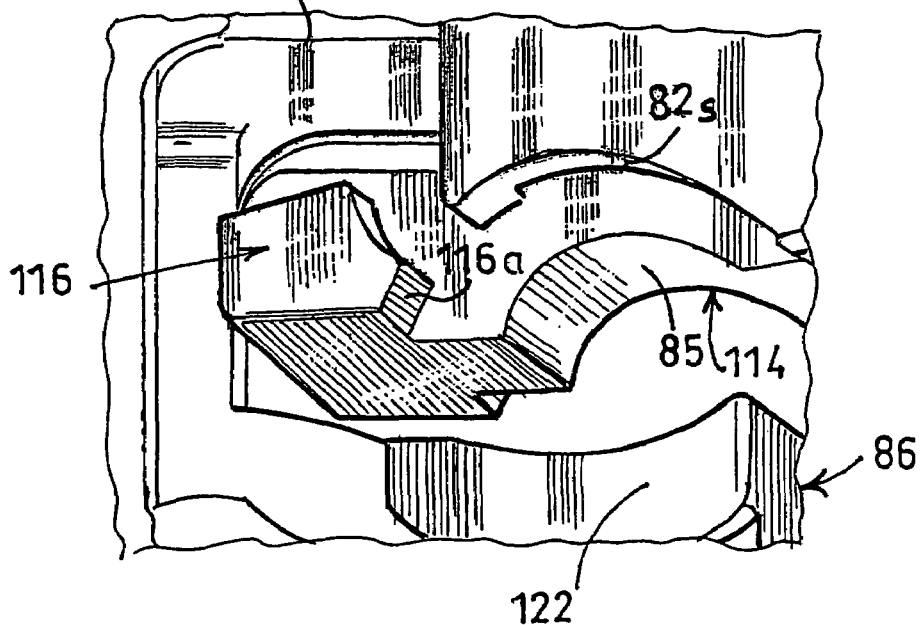
FIG. 23 is a perspective detailed view on a larger scale of the side studs of the connector shown in FIG. 21.

Finally, as can be seen in greater details in FIG. 23, the side studs 116 of the second tongue 114 are also provided with bearing surfaces 116a for bearing against the outside cylindrical surface of a second pin 62 of the second size that are complementary to the outside cylindrical surface of the second pin 62.

All of these faces thus make it possible to reduce the pressure between the second pin 62 and the connector 36, and thus to limit the wear on the connector.

The opening 82 in each cheek plate 66 is thus defined by a plurality of edges, each of which has a function for operation of the connector 36.

These edges consist of:

a first top edge 82a, situated at the front of the opening 82, and which acts as an abutment for the side stud 116 associated with the second tongue 114;

a second top edge 82s, situated at the back of the opening 82, and which has a vertical dimension relative to the connector 36 that is less than the vertical dimension of the first top edge; the second edge is curved so as to form a surface complementary to the outside cylindrical surface of a second pin 62 of the second size, so as to limit wear on the connector 36;

a rear vertical edge 82b against which the outside cylindrical surface of a second pin 62 of the second size comes to bear for positioning the second pin 62; and a bottom edge 82i and a front edge 82c against which edges the projections 122 on the locking tongue come into abutment to delimit the extent to which the locking tongue 86 can move.

A connector 36 of the invention makes it possible for a user to connect a wiper blade unit 30 to a drive arm 32a, 32b, 32c without having to worry whether the connector is indeed adapted to the type of arm.

Since this connector 36 accommodates any type of arm, it can then be mounted on the wiper blade unit 30 prior to delivery. Assembling the connector 36 with the wiper blade unit 30 requires means for enabling it to be taken hold of by a manipulator element.

Such means comprise firstly the orifice 96 which is suitable for receiving a centering finger (not shown) on the manipulator element, and they further comprise a notch 126 provided in each cheek plate 66, and that extends vertically downwards from the top surface of the cheek plate 66.

In order to enable the connector 36 to be manipulated, the notch 126 is upside-down T-shaped, i.e. the horizontal branch of the T is situated below its vertical branch. Each notch 126 is suitable for receiving a second finger (not shown) of complementary shape for the purpose of manipulating the connector 36.

In addition, each notch 126 is arranged longitudinally such that its vertical transverse plane of symmetry has the same longitudinal dimension as the transverse axis A. Thus, while the connector 36 is being mounted onto the wiper blade unit 30, i.e. while the first hinge pin 54 is being inserted into the first cylindrical recess 70, the second finger of the manipulator element exerts a vertical insertion force that is centered on the transverse hinge axis A, and thus that limits potential deformation of the connector that might damage it.

In a first embodiment of said notches 126, shown in FIG. 21, the bottom edge of the horizontal branch of each notch 126 comes flush with the top face 74s of the front element 74 of the body 68, which makes it possible to exert an insertion force on a larger horizontal area.

Figure 24:
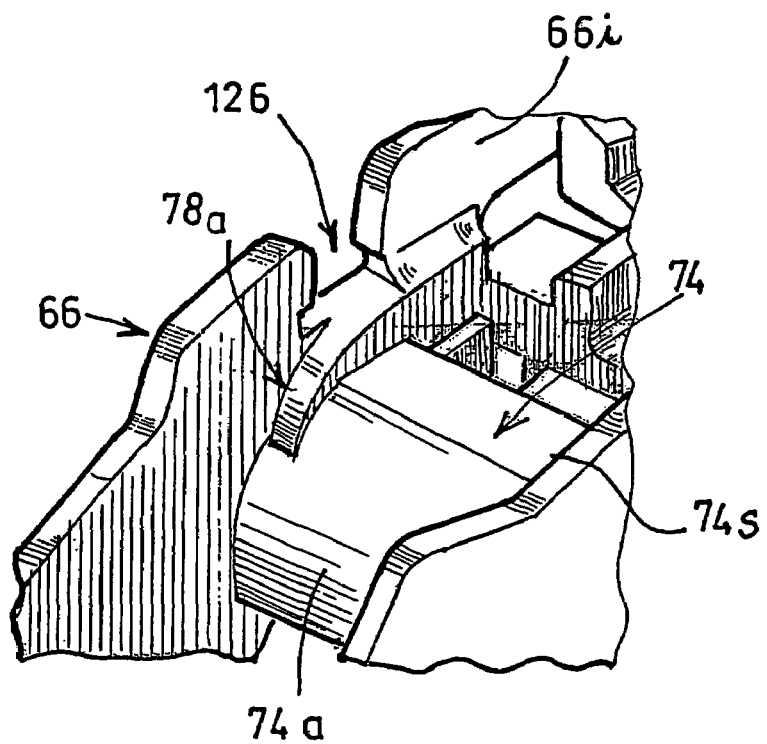
FIG. 24 is a perspective detailed view on a larger scale of the connector shown in FIG. 21, showing the configuration of the upside-down T-shaped notches.

In a second embodiment of said notches 126 shown in FIG. 24, the bottom edge of the horizontal branch of each notch 126 extends above the top face 74s of the front element 74 of the body 68. Thus, the associated rib 78a can extend longitudinally forwards to the front end of the front segment 74 of the body 68, thereby making it possible to increase the surface area for supporting the top branch 56 of the U-shaped hook.

It will also be understood that simple mechanical inversions can constitute variant embodiments of the invention. For example, the locking tongue 86 can extend longitudinally forwards from the rear bottom segment 98, and be connected to the front segment 74 via the film of material 90. Similarly, the second tongue 114 can extend longitudinally rearwards from the front segment 74, without going beyond the technical field of the invention.

Finally, the connector 36 is described above as making it possible to connect a windshield wiper arm 32a, 32b, 32c to a wiper blade unit 30 having a hinged structure. It will be understood that a connector 36 of the invention can also connect an arm 32a, 32b, 32c to a blade unit 30 in which the hinged structure is replaced with a "flat-blade" structure, i.e. a structure having spine members.

The invention claimed is:

1. A connector for connecting a windshield wiper arm to a first transverse hinge pin belonging to a structure element of a wiper blade unit, the connector comprising:

two parallel vertical side cheek plates interconnected by a body, the body defining a first recess into which the first transverse hinge pin can be inserted radially, wherein the body has an outside convex cylindrical face portion, and an inside vertical longitudinal face of each of the side cheek plates of the connector has a shaped relief comprising a longitudinally extending rib, the convex cylindrical face portion and the two opposing inside vertical longitudinal faces of the side cheek plates configured to receive an inside wall of the end of an arm that belongs to a first category of arm, which end is in the form of a U-shaped hook such that a top branch of the U-shaped hook of the first category of arm is born against a top horizontal longitudinal face of the rib of the shaped relief, wherein the connector has a second cylindrical recess, for receiving a second transverse pin of an arm that belongs to a second category of arm and that extends transversely from a side edge of the end of the second category arm; the recess defined in part by an elastically deformable locking tongue extending longitudinally between the side cheek plates and a first longitudinal end of the locking tongue is fastened to the body, adjacent the outside convex cylindrical face portion, the locking tongue resiliently retracting, to be inserted, and causing the second transverse pin to be locked transversely in a position in which it is mounted in the second cylindrical recess, and wherein a second longitudinal end of the locking tongue is fixedly connected to the body by a film of material, and the dimensions of the film are determined so that the second recess receives a second transverse pin of a first or of a second size, the second size having a larger diameter than the first size, wherein when the second transverse pin of the first size is inserted into the second recess, the film of material remains intact and resiliently flexes to lock the second transverse pin within the second recess, and wherein inserting the second transverse pin of the second size into the second recess causes the film of material to break, enabling the locking tongue to resiliently flex downwardly to receive and to lock the second transverse pin within the second recess.

2. The connector according to claim 1, wherein the body further comprises a front segment defining the first recess, a front outside wall of the front segment being suitable for being received against an inside end wall of the U-shaped hook of the first category of arm, and a rear segment extending horizontally above the locking tongue, a horizontal top face of the rear segment defining a bearing face for bearing against a top branch of the U-shaped hook, and a bottom face of the rear segment being provided with a concave portion that defines in part the second recess, in association with a concave portion of a top face of the locking tongue.

3. The connector according to claim 2, wherein the body further comprises a locking element suitable for being received in an annular groove formed in a cylindrical wall of the second transverse pin of the first size or of the second size for locking the second pin transversely in a position in which it is mounted in the second recess.

4. The connector according to claim 3, wherein the locking tongue exerts a resilient locking force on the second transverse pin so as to prevent the locking element from disengaging from the annular groove.

5. The connector according to claim 3, wherein the locking element further comprises a second elastically deformable tongue that extends substantially longitudinally forwards from a front longitudinal end of the rear segment of the body, the second elastically deformable tongue being suitable for retracting upwards to enable the second transverse pin to be inserted, and being suitable for being received at least in part in a peripheral groove in the second transverse pin so as to lock the second transverse pin transversely, in association with the locking tongue.

6. The connector according to claim 5, wherein the second elastically deformable tongue has a transverse width complementary to a width of the annular groove in the second transverse pin.

7. The connector according to claim 5, wherein the connector is suitable for receiving an end of a third category of arm, the end of the third category of arm comprising a shaped-section member segment that extends substantially longitudinally forwards in a third cylindrical recess of a longitudinal major axis, and that is open in a rear face thereof.

8. The connector according to claim 5, wherein the second tongue is provided with two side studs disposed on either side of a front longitudinal end of the second tongue, the side studs extending transversely towards an outside of the connector and passing through respective plurality of orifices in the associated side cheek plates so that a free end of each stud comes flush with an outside vertical longitudinal face of the associated cheek plate.

9. The connector according to claim 8, wherein the arm belonging to the third category of arm is in a position in which the arm is mounted in the third recess, each of the side studs being in vertical abutment against a top edge of the orifice of the associated cheek plate.

10. The connector according to claim 8, wherein each of the side studs has a bearing surface for bearing against an outside cylindrical surface of the second transverse pin, the bearing surface being complementary to the outside cylindrical surface of the second transverse pin.

11. The connector according to claim 7, wherein a free front end of the second tongue is curved back downwards so that the end of the arm belonging to the third category is inserted into the third recess, the second tongue being deformed elastically upwards and the free front end of the second tongue exerting a return force directed substantially downwards on a top face of the end of the arm belonging to the third category.

12. The connector according to claim 5, wherein the free front end of the second tongue is extended upwards by a finger so that when the end of the arm belonging to the first category is in an assembled position, the second tongue is deformed elastically downwards and acts via the finger to exert a return force directed substantially upwards on a bottom face of a horizontal top first segment of the end of the arm belonging to the first category.

13. The connector according to claim 2, wherein the first longitudinal end of the elastically deformable locking tongue is fastened to the front segment.

14. The connector according to claim 2, wherein the body further comprises a rear bottom segment having a front face that is provided with a rib which is suitable for cooperating with a releasing tab so as to hold the elastically deformable locking tongue in a position in which the second recess is open.

15. The connector according to claim 14, wherein the rear bottom segment comprises a bottom bearing face for bearing against a top face of a horizontal bottom segment of the end of the arm belonging to the first category of arm.

16. The connector according to claim 14, wherein the connector is suitable for receiving an end of a third category of arm, the end of the third category of arm comprising a shaped-section member segment that extends substantially longitudinally forwards in a third cylindrical recess of a longitudinal major axis, and that is open in a rear face thereof.

17. The connector according to claim 16, wherein the front segment of the body is provided with a notch of a longitudinal axis thereof the notch being open in a rear face thereof and forming a front end of the third recess, and the bottom face of the rear segment and a top face of the rear bottom segment of the body, in combination with the two vertical longitudinal faces on the inside of the side cheek plates, defining a rear segment of the third recess.

18. The connector according to claim 16, wherein the end of the arm belonging to the third category of arm is provided with a lug which projects upwards relative to a top face of the end of the arm belonging to the third category, and the end of the arm is suitable for being received in a vertical orifice of the rear segment for longitudinally locking the end of the arm belonging to the third category in a position in which it is mounted in the third recess.

19. The connector according to claim 2, wherein the shaped relief comprise a rib provided on the vertical longitudinal face facing inside thereof of each side plate of the connector, the rib extending longitudinally above the top face of the rear segment of the body for positioning the end of the arm belonging to the first category.

20. The connector according to claim 19, wherein the rib is formed so that a top face of the rib forms a vertical bearing surface for a top branch of the U-shaped hook having at least a first size of arm, and so that a vertical face thereof transversely positions the top branch of the U-shaped hook of the arm of a second size.

21. The connector according to claim 2, wherein each cheek plate is provided with a notch which extends vertically downwards from a top edge of the associated cheek plate and which is complementary to a manipulator element for manipulating the connector.

22. The connector according to claim 21, wherein the notch substantially forms an upside-down T-shape in which a bottom edge of a horizontal branch of the T-shape extends vertically above a top face of the front segment of the body of the connector.

23. The connector according to claim 1, wherein a portion of the locking tongue is curved downwards so that for at least one size of the arm belonging to the first category position, in an assembled the film of material is broken, and the locking tongue is deformed elastically upwards so as to exert a substantially vertical force downwards on the top face of the horizontal bottom segment of the end of the arm belonging to the first category.

24. The connector according to claim 23, wherein for at least a second size of the arm belonging to the first category, the film of material connects the second longitudinal end of the locking tongue to the body so as to exert a substantially vertical force downwards on the top face of a second horizontal bottom segment of the end of the arm belonging to the first category.

25. The connector according to claim 1, wherein each side edge of the locking tongue facing a respective one of the side cheek plates is extended transversely outwards by a rounded projection.

26. The connector according to claim 1, wherein a front end segment of each cheek plate extends cantilevered out forwards from the body and is elastically deformable and is provided with a ramp-forming abutment on the vertical longitudinal face facing inside thereof so as to retract when the end of the arm belonging to the first category is inserted, and so as to lock the U-shaped hook in a position in which it is mounted around the body of the connector.

27. The connector according to claim 26, wherein the ramp-forming abutment extends over a top portion of the front end segment of the associated cheek plate, and a bottom portion of the front end segment is provided with an opening for insertion of the U-shaped hook.

28. The connector according to claim 1, wherein the shaped relief further comprises a second projection disposed vertically below the body so as to perform at least in part a positioning of the connector against an inside wall of the end of the arm belonging to the first category.

29. The connector according to claim 28, wherein the second projection is formed so that a top face thereof vertically positions the connector for a first size of the arm belonging to the first category, a bottom face thereof vertically positions the connector for a second size of the arm belonging to the first category, and an inside vertical face thereof transversely positions the connector for a third size of the arm belonging to the first category.

30. The connector according to claim 1, wherein a bottom face of the locking tongue is provided with at least one rib for vertically and/or transversely positioning the arm belonging to the first category and of at least one size.

31. The connector according to claim 30, wherein the at least one rib extends substantially vertically downwards along a side edge of the bottom face of the locking tongue.

* * * * *